United States Patent
Awata et al.

(10) Patent No.: US 6,263,015 B1
(45) Date of Patent: Jul. 17, 2001

(54) ANALOG/DIGITAL INTEGRATED SUBSCRIBER CIRCUIT

(75) Inventors: Yutaka Awata; Seiji Miyoshi; Minoru Hirahara; Takuo Gotoda; Hiroaki Itokawa, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 08/960,911

(22) Filed: Oct. 30, 1997

(30) Foreign Application Priority Data

Mar. 31, 1997 (JP) .................................... 9-080707
Apr. 21, 1997 (JP) .................................... 9-102887

(51) Int. Cl.⁷ .................................................. H04L 25/00
(52) U.S. Cl. ......................... 375/216; 375/257; 320/140; 379/399
(58) Field of Search ................... 375/216, 219, 375/220, 238, 257, 258; 379/279, 286, 399, 156, 413, 93.05; 455/553, 4.2; 370/311, 321, 336, 337; 320/140, 148, 149, 151, 152; 396/206

(56) References Cited

U.S. PATENT DOCUMENTS

| | | | |
|---|---|---|---|
| 5,142,571 | * 8/1992 | Suzuki et al. | 379/279 |
| 5,305,312 | * 4/1994 | Fornek et al. | 370/264 |
| 5,323,460 | * 6/1994 | Warner et al. | 379/399 |
| 5,436,822 | * 7/1995 | West, Jr. | 363/63 |
| 5,459,788 | * 10/1995 | Kim | 379/399 |
| 5,469,746 | * 11/1995 | Fukunaga et al. | 73/861.12 |
| 5,539,805 | * 7/1996 | Bushue et al. | 379/34 |
| 5,590,182 | * 12/1996 | Stevens et al. | 379/130 |
| 5,625,685 | * 4/1997 | Allegranza et al. | 379/399 |
| 5,666,355 | * 9/1997 | Huah et al. | 370/311 |
| 5,734,711 | * 3/1998 | Kleffner | 379/323 |
| 5,757,265 | * 5/1998 | Kogure et al. | 340/310.01 |
| 5,812,928 | * 9/1998 | Watson, Jr. et al. | 455/5.1 |
| 5,815,569 | * 9/1998 | Akhteruzzaman | 379/399 |
| 5,859,872 | * 1/1999 | Townshend | 375/242 |
| 5,878,133 | * 3/1999 | Zhou et al. | 379/413 |
| 5,926,544 | * 7/1999 | Zhou | 379/413 |
| 5,990,577 | * 11/1999 | Kamioka et al. | 307/26 |
| 6,031,915 | * 2/2000 | Okano et al. | 381/56 |
| 6,172,615 | * 1/2001 | Kogure | 340/870.02 |

\* cited by examiner

Primary Examiner—Chi Pham
Assistant Examiner—Emmanuel Bayard
(74) Attorney, Agent, or Firm—Helfgott & Karas, P.C.

(57) ABSTRACT

An analog/digital integrated subscriber circuit includes a power supply part supplying power with respect to a subscriber line, and a signal processing part carrying out a signal processing. The power supply part is provided with a D.C./D.C. converter which controls an ON-time of a switching by detecting an output voltage and an output current supplied to the subscriber line. The D.C./D.C. converter includes a switching mechanism for switching a power supply characteristic of the power supply part to a constant current characteristic up to a maximum output voltage when supplying the power with respect to a digital subscriber line and to a constant voltage characteristic having a voltage lower than the maximum output voltage when supplying the power with respect to an analog subscriber line.

12 Claims, 24 Drawing Sheets

FIG.14

CONTENTS OF
ADDRESS ROM

| # | |
|---|---|
| 0 | F0 = (AGC = 0) |
| | F1 = (AGC = 0) |
| | F2 = (AGC = 0) |
| | F3 = (AGC = 0) |
| | F4 = (AGC = 0) |
| 5 | F0 = (AGC = 1) |
| | F1 = (AGC = 1) |
| | F2 = (AGC = 1) |
| | F3 = (AGC = 1) |
| | F4 = (AGC = 1) |
| 10 | F0 = (AGC = 2) |
| | F1 = (AGC = 2) |
| | F2 = (AGC = 2) |
| | F3 = (AGC = 2) |
| | F4 = (AGC = 2) |
| 15 | F0 = (AGC = 3) |
| | F1 = (AGC = 3) |
| | F2 = (AGC = 3) |
| | F3 = (AGC = 3) |
| | F4 = (AGC = 3) |
| 20 | $\alpha 0$ |
| 21 | $\alpha 1$ |
| 22 | $\alpha 2$ |
| 23 | $\alpha 3$ |

ANALOG/DIGITAL INTEGRATED SUBSCRIBER CIRCUIT

BACKGROUND OF THE INVENTION

The present invention generally relates to analog/digital integrated subscriber circuits, and more particularly to an analog/digital integrated subscriber circuit which is applicable to either an analog subscriber line or a digital subscriber line.

In many situations, analog subscriber lines and digital subscriber lines are connected to the same switching system, and an exclusive subscriber circuit is provided with respect to each of the analog subscriber line and the digital subscriber line. Accordingly, when an analog subscriber terminal is replaced by a digital subscriber terminal, for example, it is necessary to replace the subscriber circuit in the switching system or to change the connection in the switching system. In view of the above, it is conceivable to use a common subscriber circuit as the subscriber circuit which connects the analog subscriber line and the subscriber circuit which connects the digital subscriber line, however, no concrete structure has been proposed to realize such a conceivable common subscriber circuit.

FIG. 1 shows an example of a conventional analog subscriber circuit. FIG. 1 shows a subscriber line 100, a hybrid circuit (HYB) 101 which makes a 2-wire/4-wire conversion, a power supply part 102, a pre-filter (PREFIL) 103, a post-filter (PSTFIL) 104, an analog-to-digital (A/D) converter 105, a digital signal processor (DSP) 106, a linear p converter (L/$\mu$) 107, a $\mu$ linear converter ($\mu$/L) 108, a network interface circuit (NIF) 109, a $\Sigma/_\Delta$ modulator (SDMA) 110 which converts an analog signal into a digital signal by a $\Sigma/_\Delta$ modulation, a decimation filter (DFIL) 111, a $\Sigma/_\Delta$ modulator (SDMD) 112 which converts a digital signal into an analog signal by a $\Sigma/_\Delta$ modulation, an interpolation filter (IFIL) 113, a balancing network (BN) 114, a bandpass filter (BPF) 115, a lowpass filter (LPF) 116, and a digital-to-analog (D/A) converter 117.

The power supply part 102 has a constant voltage supplying characteristic for supplying a power supply voltage of 48 V, for example, with respect to the subscriber line 100. An analog voice signal from the subscriber line 100 is supplied to the A/D converter 105 via the hybrid circuit 101 and the pre-filter 103, and is converted into a digital signal. The digital signal is supplied to the DSP 106 which realizes processing functions such as filtering by the BPF 115, the LPF 116 and the balancing network 114. The linear p converter 107 converts the digital signal from the DSP 106 into a 64 kbps digital voice signal having an 8 bits/sample structure according to the $\mu$ compression and expansion rule, and transfers the digital voice signal to a channel switch side via the network interface circuit 109.

On the other hand, the digital voice signal which is in conformance with the $\mu$ compression and expansion rule and is input to the network interface circuit 109 is converted into a linear digital voice signal by the $\mu$ linear converter 108. The linear digital voice signal is passed through the LPF 116 of the DSP 106, and is input to the D/A converter 117 which is made up of the interpolation filter 113 and the $\Sigma/_\Delta$ modulator 112. Hence, the linear digital voice signal is converted into an analog voice signal and is transmitted to the subscriber line 100 via the post-filter 104 and the hybrid circuit 101.

FIG. 2 shows an example of a conventional digital subscriber circuit. FIG. 2 shows a subscribe line 120, a hybrid circuit (HYB) 121, a power supply part 122, a pre-filter (PREFIL) 123, an A/D converter 124, a feed forward equalizer (FFE) 125, a decision feedback equalizer (DFE) 126, an automatic gain control (AGC) part 127, a digital phase locked loop (DPLL) circuit 128, a network interface circuit (NIF) 129, an AMI decoder (AMI) 130, a line driver (DRV) 131, a sequence controller (SEQ) 132, a $\Sigma/_\Delta$ modulator (SDM) 133, and a decimation filter (DFIL) 134.

The power supply part 122 has a constant current characteristic for supplying a power supply current of 39 mA, for example, with respect to the subscriber line 120. The sequence controller 132 carries out a training control when making a call setup between the sequence controller 132 and a digital subscriber terminal which is connected to the subscriber line 120, via a path which is not shown in FIG. 2. A waveform equalization is made by the feed forward equalizer 125 and the decision feedback equalizer 126, and a function of the feed forward equalizer 125 is selected by the AGC part 127, so that a digital signal having a desired level is transferred to the channel switch side via the network interface circuit 129.

FIG. 3 is a diagram for explaining the operation of a conventional DSP, such as the DSP 106 of the analog subscriber circuit described above. In FIG. 3, a computing block 141, an address computing block 132, an internal memory (IRAM) 143, a program sequence control block 144, a special register/counter block 145 and an input/output (I/O) interface block 146 are coupled via an internal bus 147.

The computing block 141 includes an arithmetic logic unit ALU, a multiplier MPY, registers A, B and P, and accumulators C and D, and a multiplication is carried out by the multiplier MPY and various operations are carried out by the arithmetic logic unit ALU. In addition, the address computing block 142 includes an address computing unit AALU, registers X0, B0, X1, B1, X2, VSM, PAG and EAR, and a direct memory access (DMA) counter DMC. For example, it is possible to obtain an effective address from a result of additions of the contents of the base registers B0 and B1 and the index registers X0 and X1 and an offset.

In this particular case, the internal memory 143 is made of a 3-port random access memory (RAM). The program sequence control block 144 includes an instruction memory IROM, an instruction register IR, a program counter PC, a decoder DEC, loop counters C0 and C1, and a repeat counter RPC. An address is loaded by successively incrementing the program counter PC or by a branch instruction, interrupt or the like, and an instruction is read from the instruction memory IROM and set in the instruction register IR, so as to control various parts based on a decoding carried out by the decoder DEC.

The special register/counter block 145 includes a timer counter TIM, a mode setting register MOD, an interrupt mask register MASK, a status register ST, and a register group Reg.File. The I/O interface block 146 includes serial input registers SI0 and SI1, serial output registers SO0 and SO1, a parallel input register PI, a parallel output register PO, a parallel address input register PIA, a parallel address output register POA, and a unit number register PAD.

Due to the progress made in the semiconductor integration technology, the size of various parts of the system have been reduced. For example, the analog subscriber circuit is formed as a single package with respect to eight subscribers, and the digital subscriber circuit is formed as a single packet with respect to four subscribers. As a result, the size of the system as a whole can be reduced. However, if one of the eight subscribers changes his analog subscriber terminal to a digital subscriber terminal, it becomes necessary to modify the position of this subscriber with respect to the analog subscriber circuit. In addition, if a fault is generated in the structure of the analog subscriber circuit related to one of the eight subscribers of the analog subscriber circuit, it becomes necessary to forcibly disconnect the remaining seven subscribers when replacing the analog subscriber circuit by a new package of the analog subscriber circuit. As a result, there was a problem in that the service provided with respect to the subscribers becomes poor.

In order to solve the problem described above, it is conceivable to provide a single package of the subscriber circuit with respect to each subscriber. In this conceivable case, when replacing the analog subscriber terminal by a digital subscriber terminal or vice versa or, when a fault is generated in the subscriber circuit, it is simply necessary to replace one package of the subscriber circuit. However, it becomes necessary to provide in advance a large number of analog subscriber circuits and a large number of digital subscriber circuits, and the system as a whole becomes expensive. Further, if a large number of subscribers are connected to the switching system, it is not easy to replace the packages without an error.

Alternatively, it is conceivable to use a common subscriber circuit as the analog subscriber circuit and the digital subscriber circuit. However, the power supply part 102 of the analog subscriber circuit is designed to supply a constant voltage of –48 V, for example, to the subscriber line 100. On the other hand, the power supply part 122 of the digital subscriber circuit is designed to supply a constant current of 39 mA, for example, to the subscriber line 120. If the impedance of the subscriber liner 120 is large, the output voltage of the power supply part 122 rises, but a maximum output voltage is set to approximately 60 V, for example. Therefore, due to the different characteristics of the power supply parts 102 and 112, it was impossible to use a common subscriber circuit as the analog subscriber circuit and the digital subscriber circuit.

On the other hand, in the analog subscriber circuit, the sampling frequency is 8 kHz, for example, and voice signal processings such as filtering and computing may be carried out by the DSP. But in the digital subscriber circuit, the sampling frequency must be 320 kHz, for example, when a ping-pong transmission system is employed, and it is not possible to simply apply the DSP of the analog subscriber circuit to the digital subscriber circuit. Furthermore, when an echo cancelling system is employed, it is necessary to have a large equalizing capability with respect to the intersymbol interference component so as to cope even with a 2-B 1-Q code which includes a D.C. component. Therefore, compared to the DSP of the analog subscriber circuit, the DSP of the digital subscriber circuit must operate at a high speed, and there was a problem in that the digital subscriber circuit becomes expensive.

SUMMARY OF THE INVENTION

Accordingly, it is a general object of the present invention to provide a novel and useful analog/digital integrated subscriber circuit in which the problems described above are eliminated.

Another and more specific object of the present invention is to provide an analog/digital integrated subscriber circuit in which main portions of power supply parts and signal processing parts of an analog subscriber circuit and a digital subscribe circuit are used in common to realize an inexpensive system.

Still another object of the present invention is to provide an analog/digital integrated subscriber circuit comprising a power supply part supplying power with respect to a subscriber line, and a signal processing part carrying out a signal processing, where the power supply part includes a D.C./D.C. converter controlling an ON-time of a switching by detecting an output voltage and an output current supplied to the subscriber line, and the D.C./D.C. converter comprises switching means for switching a power supply characteristic of the power supply part to a constant current characteristic up to a maximum output voltage when supplying the power with respect to a digital subscriber line and to a constant voltage characteristic having a voltage lower than the maximum output voltage when supplying the power with respect to an analog subscriber line. According to the analog/digital integrated subscriber circuit of the present invention, it is possible to use a main part of the power supply part in common with respect to the analog subscriber line and the digital subscriber line, thereby making it possible to reduce the cost of the system as a whole since it is possible to flexibly cope with a change in the subscriber line and the subscriber terminal.

Other objects and further features of the present invention will be apparent from the following detailed description when read in conjunction with th accompanying drawings.

BRIEF DESCRIPTION OF THE DRAWINGS

FIG. 14 is a diagram for explaining the contents of a coefficient memory;

DESCRIPTION OF THE PREFERRED EMBODIMENTS

Figure 4:
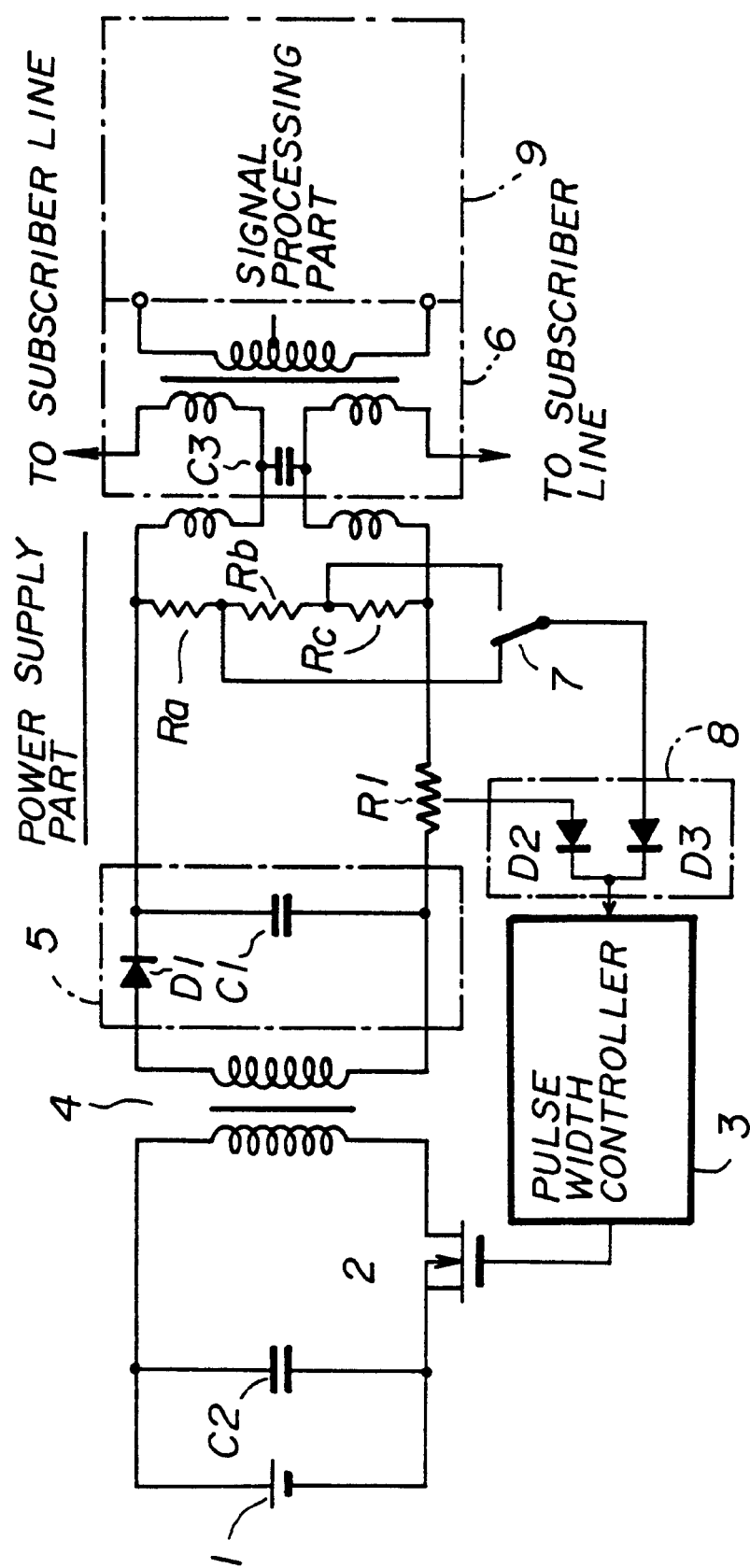
FIG. 4 is a diagram showing an important part of a first embodiment of an analog/digital integrated subscriber circuit according to the present invention.

FIG. 4 shows an important part of a first embodiment of an analog/digital integrated subscriber circuit according to the present invention. FIG. 4 shows a D.C. power supply 1, a switching transistor 2, a pulse width controller 3, a transformer 4, a rectifying and smoothing part 5, a hybrid circuit 6 including a hybrid transformer, a switch 7, an OR circuit 8, a signal processing part 9, capacitors C1 through C3, resistors Ra through Rc, a current detector RI, and diodes D1 through D3.

In this embodiment, a power supply part is formed by a D.C./D.C. converter, and the power is supplied from the power supply part to an analog subscriber line and a digital subscriber line. The power supply part is coupled to the signal processing part 9 which includes various filters and a digital signal processor (DSP), via the hybrid circuit 6. A voltage detector which is made up of the resistors RE through Rc and the current detector RI are coupled to the pulse width controller 3 via the OR circuit 8 which is made up of the diodes D2 and D3. Various known circuits may be used as the pulse width controller 3. For example, the pulse width controller 3 may be constructed to compare a sawtooth wave signal from a sawtooth wave generator and a detection signal, and produce a signal which turns ON the switching transistor 2 during a time in which the level of the sawtooth wave signal is greater than that of the detection signal.

Figure 1:
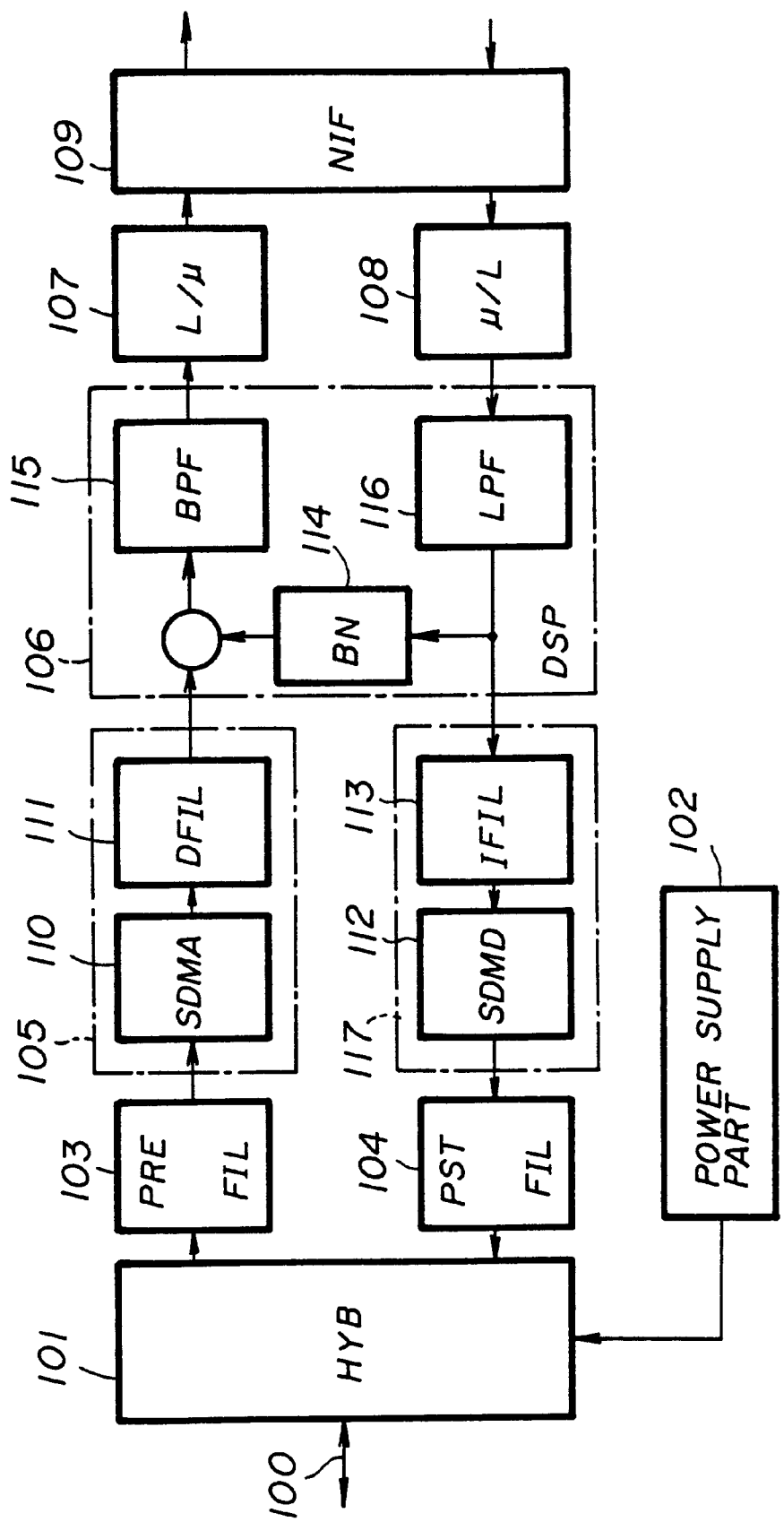
FIG. 1 is a system block diagram showing an example of a conventional analog subscriber circuit.

The ON/OFF state of the switching transistor 2 is controlled by the pulse width controller 3, and a current is supplied from the D.C. power supply 1 to a primary winding of the transformer 4. A voltage induced at a secondary winding of the transformer 4 is rectified and smoothened by the rectifying and smoothing part which is made up of the diode D1 and the capacitor C1, and is supplied to the subscriber line via a choke coil and a winding of the hybrid transformer of the hybrid circuit 6. The current supplied to the subscriber line is detected by the current detector RI. In addition, the rectified and smoothened output voltage of the rectifying and smoothing part is divided and detected by the resistors Ra and Rb and the resistor Rc, and is also divided and detected by the resistor Ra and the resistors Rb and Rc. FIG. 1 shows a case where these resistors Ra through Rc form the voltage detector.

When supplying the power to the digital subscriber line, the pulse width controller 3 control the ON-time of the switching transistor 2 so that a current of 39 mA, for example, is supplied to the digital subscriber line depending on a detection signal obtained from the current detector RI via the diode D2. In other words, the power is supplied with a constant current characteristic. As the impedance of the digital subscriber line increases and the rectified and smoothened output voltage of the rectifying and smoothing part reaches a maximum output voltage of 60 V, for example, and when the switch 7 is in a stage shown in FIG. 1, a detection signal obtained from the voltage division by the resistors Ra and Rb and the resistor Rc becomes greater than the detection signal obtained from the current detector RI and is input to the pulse width controller 3 via the diode D3. As a result, the pulse width controller 3 controls the ON-time of the switching transistor 2, thereby maintaining the rectified and smoothened output voltage of the rectifying and smoothing part to a constant voltage of 60 V.

On the other hand, when supplying the power to the analog subscriber line, the switch 7 is switched over, and a detection signal obtained from the voltage division by the resistor Ra and the resistors Rb and Rc is input to the pulse width controller 3 via the diode D3. In this case, a relationship $\{(Ra+Rb)/Rc\}>\{Ra/(Rb+Rc)\}$ stands. Hence, the pulse width control is switched from the pulse width control depending on the detection signal from the current detector RI to the pulse width control depending on the detection signal from the voltage detector. As a result, a rectified and smoothened output voltage of the rectifying and smoothing part, which is 48 V, for example, is supplied to the analog subscriber line by a constant voltage control.

Figure 5:
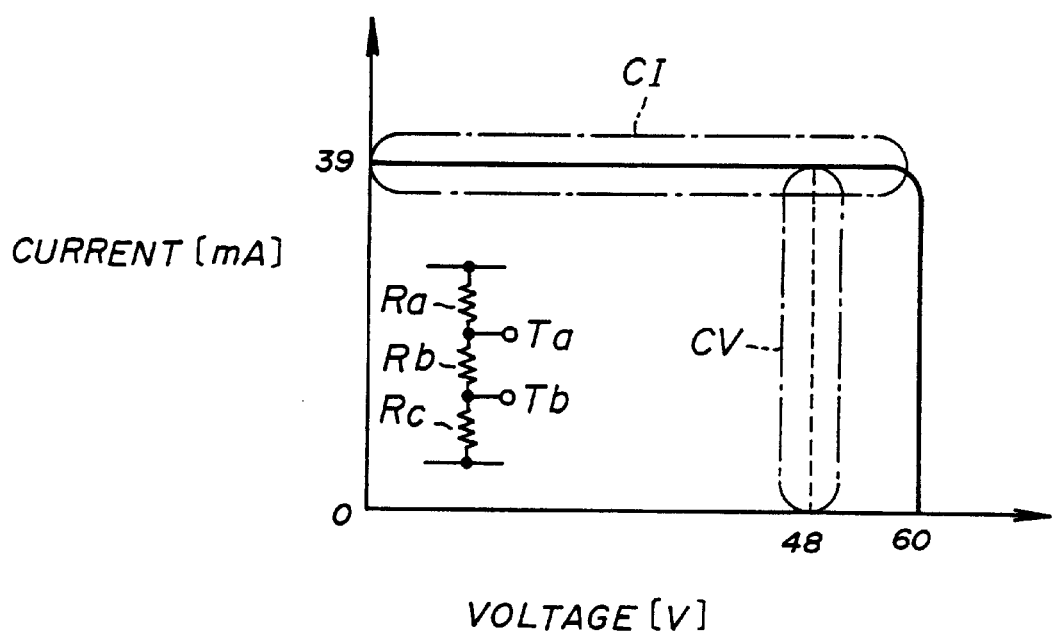
FIG. 5 is a diagram for explaining a characteristic of the first embodiment.

FIG. 5 shows a characteristic of the first embodiment. When supplying the power to the digital subscriber line, a current of 39 mA is supplied in a region CI of a constant current characteristic, and e drooping characteristic is obtained at a maximum output voltage of 60 V. On the other hand, when supplying power to the analog subscriber line, a voltage of 48 V which is lower than the maximum output voltage is supplied in a region CV of a constant voltage characteristic. If the voltage detector is made up of resistors Ra, Rb and Rc, a switching is made to a tap Tb when supplying the power to the digital subscriber line, and the rectified and smoothened output voltage is controlled so as not to exceed the maximum output voltage of 60 V, so as to obtain the constant current characteristic. On the other hand, a switching is made to a tap Ta in this case when supplying the power to the analog subscriber line, and the rectified and smoothened output voltage is controlled to become 48 V, so as to obtain the constant voltage characteristic.

A switching means for switching the constant voltage characteristic and the constant current characteristic of the D.C./D.C. converter described above may be realized by manually operating the switch 7 or, by controlling the switch 7 in response to a switching control signal. Of course, it is possible to use other means for switching the power supply characteristics. For example, the switch 7 may be made of a switching element such as a transistor, and the power supply characteristic may be switched depending on a switch instruction from a maintenance console or the like, based on position information of the subscriber line. In this case, an unattended switching system bay be remote controlled to easily cope with a modification of the subscriber terminal.

In addition, it is possible to connect a terminating impedance which is not shown in FIG. 1 to the hybrid circuit 6, and the impedance value of the terminating impedance may be switched with respect to the digital subscriber line and the analog subscriber line. Moreover, a turn ratio of the windings of the hybrid transformer of the hybrid circuit 6 may be switched with respect to the digital subscriber line and the analog subscriber line, and the transmitting signal level to the subscriber line may be switched. Furthermore, as in the case of a normal subscriber circuit, it is possible to additionally provide an inversion means for inverting the polarity of the power supply, a surge protection means and the like.

Figure 6:
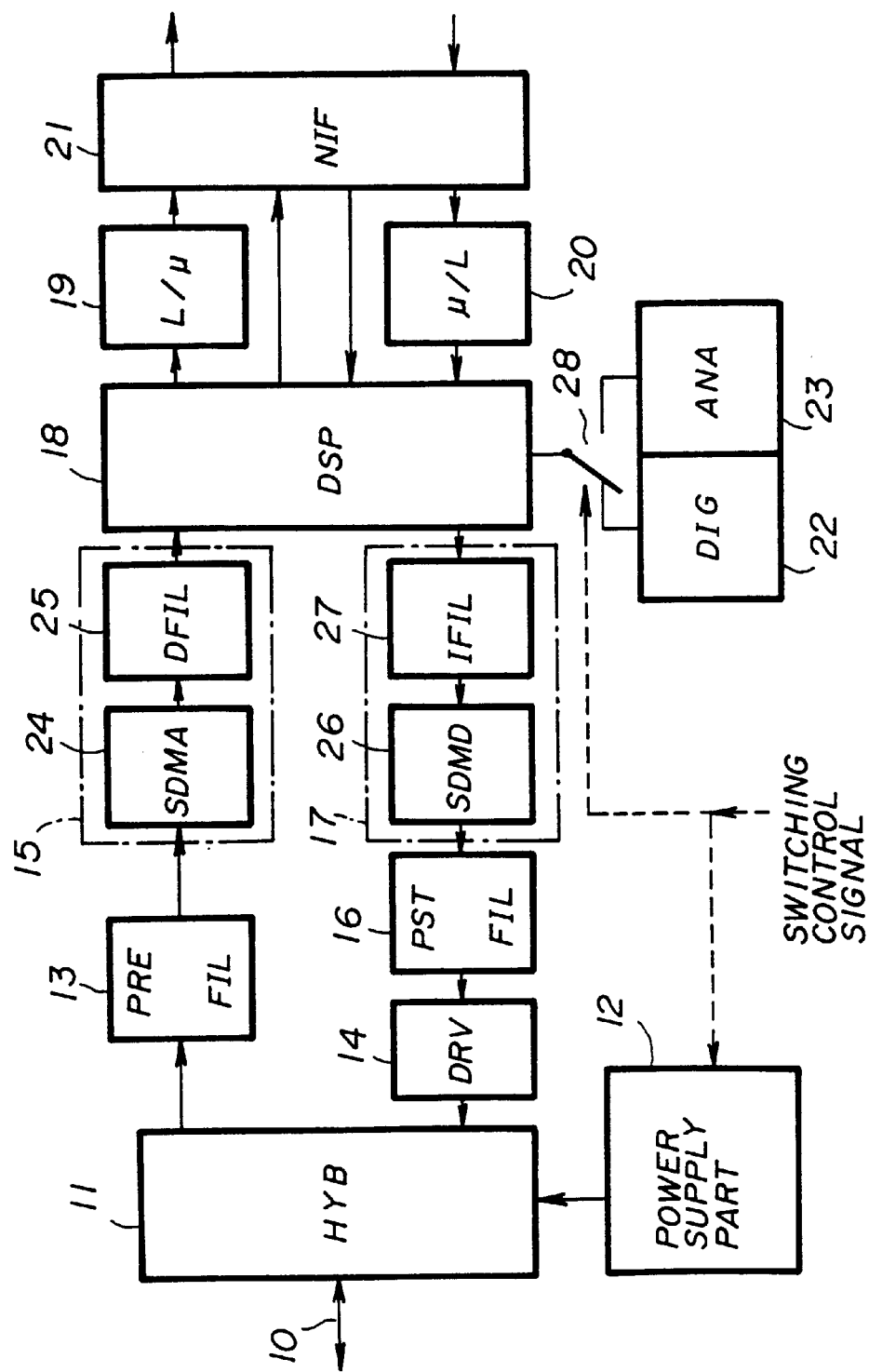
FIG. 6 is a system block diagram showing a second embodiment of the analog/digital integrated subscriber circuit according to the present invention.

FIG. 6 shows a second embodiment of the analog/digital integrated subscriber circuit according to the present invention. FIG. 6 shows a subscriber line 10, a hybrid circuit (HYB) 11, a power supply part 12, a pre-filter (PREFIL) 13, a line driver (DRV) 14, an A/D converter 15, a post-filter (PSTFIL) 16, a D/A converter 17, a DSP 18, a linear p converter (L/μ) 19, a μ linear converter (μ/L) 20, a network interface circuit (NIF) 21, a digital subscriber firmware (DIG) 22, an analog subscriber firmware (ANA) 23, a $\Sigma/_\Delta$ modulator (SDMA) 24 which converts an analog signal into a digital signal by a $\Sigma/_\Delta$ modulation, a decimation filter (DFIL) 25, a $\Sigma/_\Delta$ modulator (SDMD) 26 which converts a digital signal into an analog signal by a $\Sigma/_\Delta$ modulation, an interpolation filter (IFIL) 27, and a switch 28.

For example, the power supply part 12 has the construction shown in FIG. 4, and is switched responsive to the switching control signal so as to have the constant current characteristic when supplying the power with respect to the digital subscriber line, and to have the constant voltage characteristic when supplying the power with respect to the analog subscriber line. In addition, the switch 28 is controlled responsive to the switching control signal so as to connect the digital subscribe firmware 22 to the DSP 18 when the connection is made to the digital subscriber line, and to connect the analog subscriber firmware 23 to the DSP 18 when the connection is made to the analog subscriber line.

In addition, the hybrid circuit 11, the pre-filter 13, the line driver 14, the A/D converter 15 and the D/A converter 17 are used in common with respect to the analog subscriber circuit and the digital subscriber circuit. Further, the DSP 106 of the conventional analog subscriber circuit, and the feed forward equalizer 125, the decision feedback equalizer 126, the AGC part 127, the digital PLL circuit 128 and the sequence controller 132 of the conventional digital subscriber circuit are realized by the common DSP 18.

It is possible to form the hybrid circuit 11 by the hybrid transformer of the hybrid circuit 6 shown in FIG. 4, and to cope with the signal levels with respect to the digital subscriber line and the analog subscriber line by switching the turn ratio of the windings of the hybrid transformer of the hybrid circuit 6. In addition, with regard to the terminating impedance with respect to the digital subscriber line and the analog subscriber line, the terminating impedance may be connected to the hybrid circuit 11 and the impedance value thereof may be switched.

Figure 7:
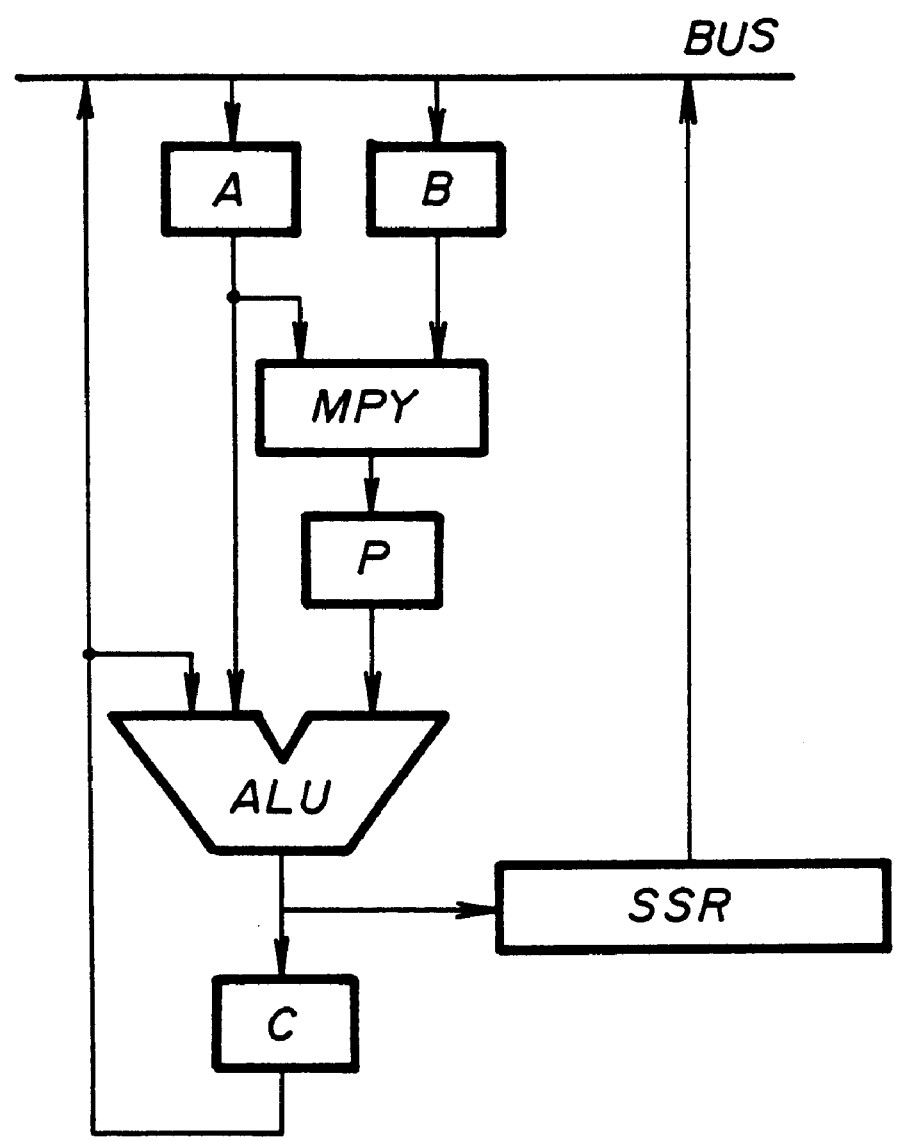
FIG. 7 is a system block diagram for explaining a computing block of the second embodiment.

FIG. 7 shows a computing block, which corresponds to the computing block 141 of the conventional DSP, of the DSP 18 which is used in common with respect to the digital subscriber circuit and the analog subscriber circuit. The computing block shown in FIG. 7 includes a symbol shift register SSR, and a reference can be made to this symbol register SSR via a bus BUS. Hence, it is possible to omit a virtual shift process using a memory, thereby simplifying the processing step. This computing block further includes a computing register A, a multiplying register B, a multiplication result storing register P, an accumulator C, a multiplier MPY, and an arithmetic logic unit ALU.

Figure 8:
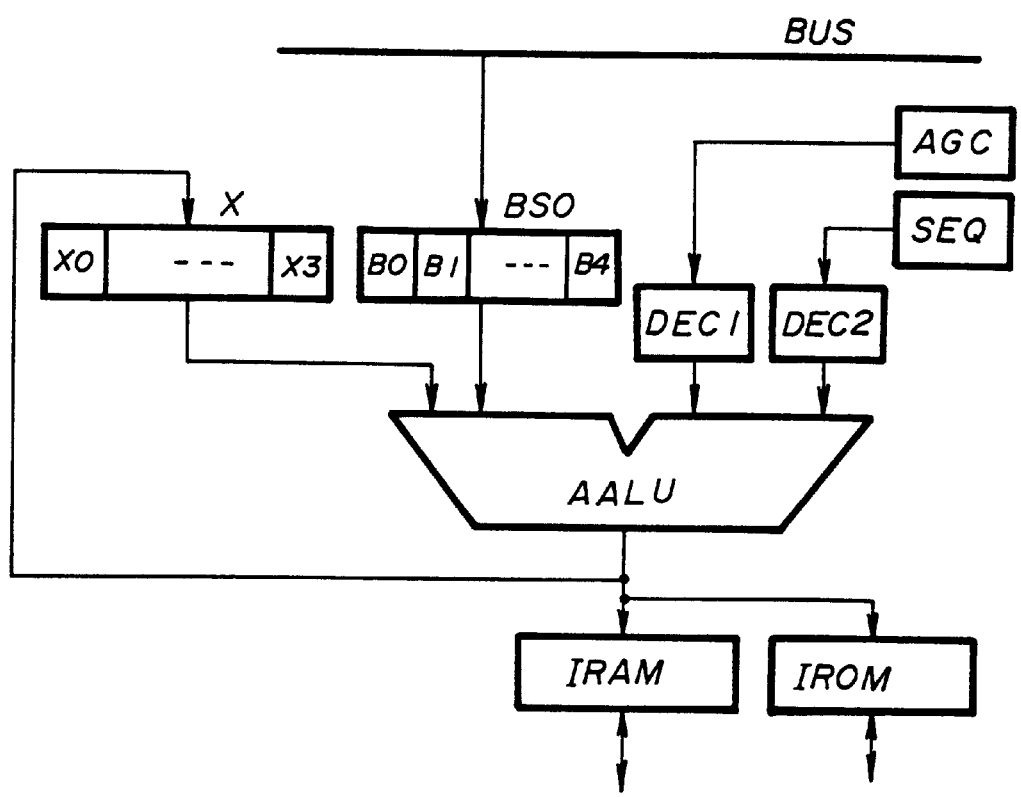
FIG. 8 is a system block diagram for explaining an address computing block of the second embodiment.

FIG. 8 shows a computing block, which corresponds to the address computing block 142 of the conventional DSP, of the DSP 18 which is used in common with respect to the digital subscriber circuit and the analog subscriber circuit. In the computing block shown in FIG. 8, contents indicating the state of the training sequence of a sequence controller SEQ are decoded by a decoder DEC2 and input to an address computing unit AALU. In addition, a code of an AGC part AGC is decoded by a decoder DEC1 and input to the address computing unit AALU. This computing block further includes a bus BUS, an index register X (X0, . . . , X3), and a base register BSO (B0, . . . , B4).

The sampling frequencies of the $\Sigma/_\Delta$ modulators 24 and 26 in the A/D converter 15 and the D/A converter 17 may also be switched with respect to the digital subscriber line and the analog subscriber line. Moreover, it is also possible to switch the cutoff frequencies of the pre-filter 13 and the post-filter 16 with respect to the digital subscriber line and the analog subscriber line.

Figure 2:
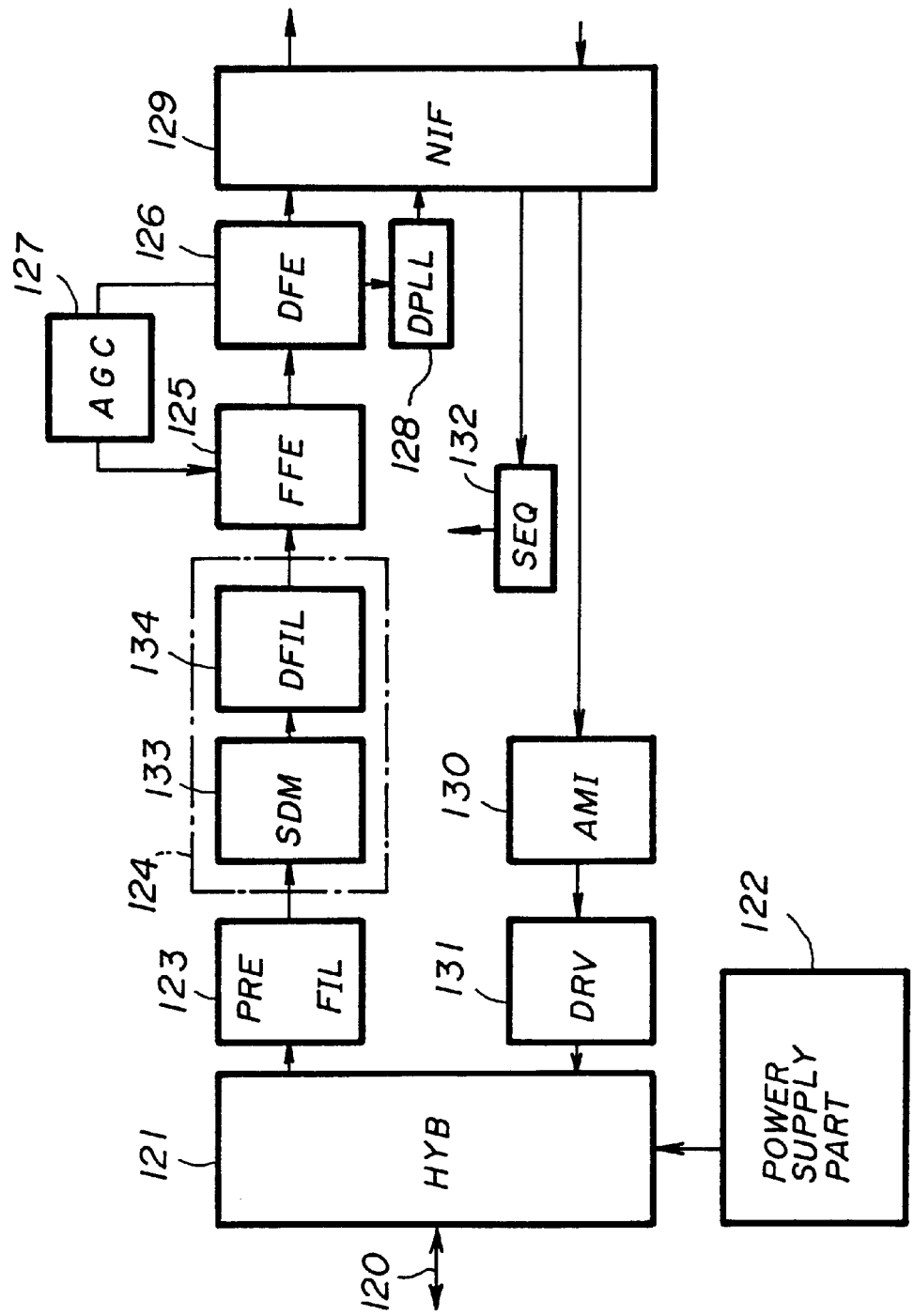
FIG. 2 is a system block diagram showing an example of a conventional digital subscriber circuit.
Figure 9:
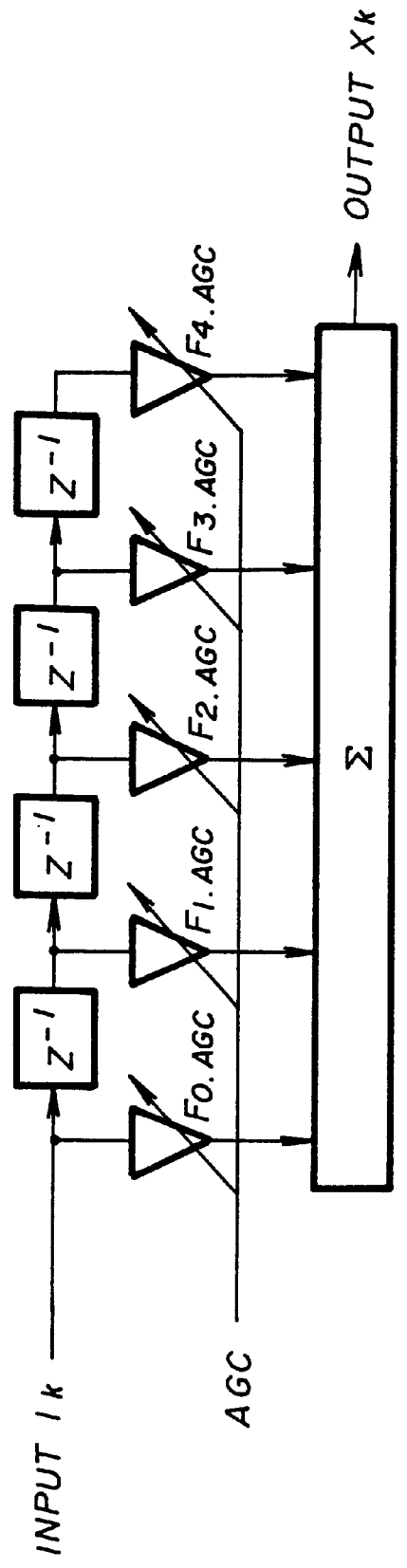
FIG. 9 is a diagram for explaining the operation of a feed forward equalizer.

FIG. 9 shows a feed forward equalizer which may be used as the feed forward equalizer (FFE) 125 in FIG. 2. The feed forward equalizer 125 includes delay circuits $Z^{-1}$, coefficient multipliers $F_{0,AGC}$ through $F_{4,AGC}$, and an adder Σ. A relationship between an input signal $I_k$ and an output signal $X_k$ can be described by the following formula, where AGC denotes a code indicating a loss of the subscriber line in the AGC part 127 shown in FIG. 2, and AGC=0 to 3, for example.

$$X_k = \Sigma^4_{n=0}(I_{(k-n)} \times F_{(n),AGC}) \tag{1}$$

Figure 10:
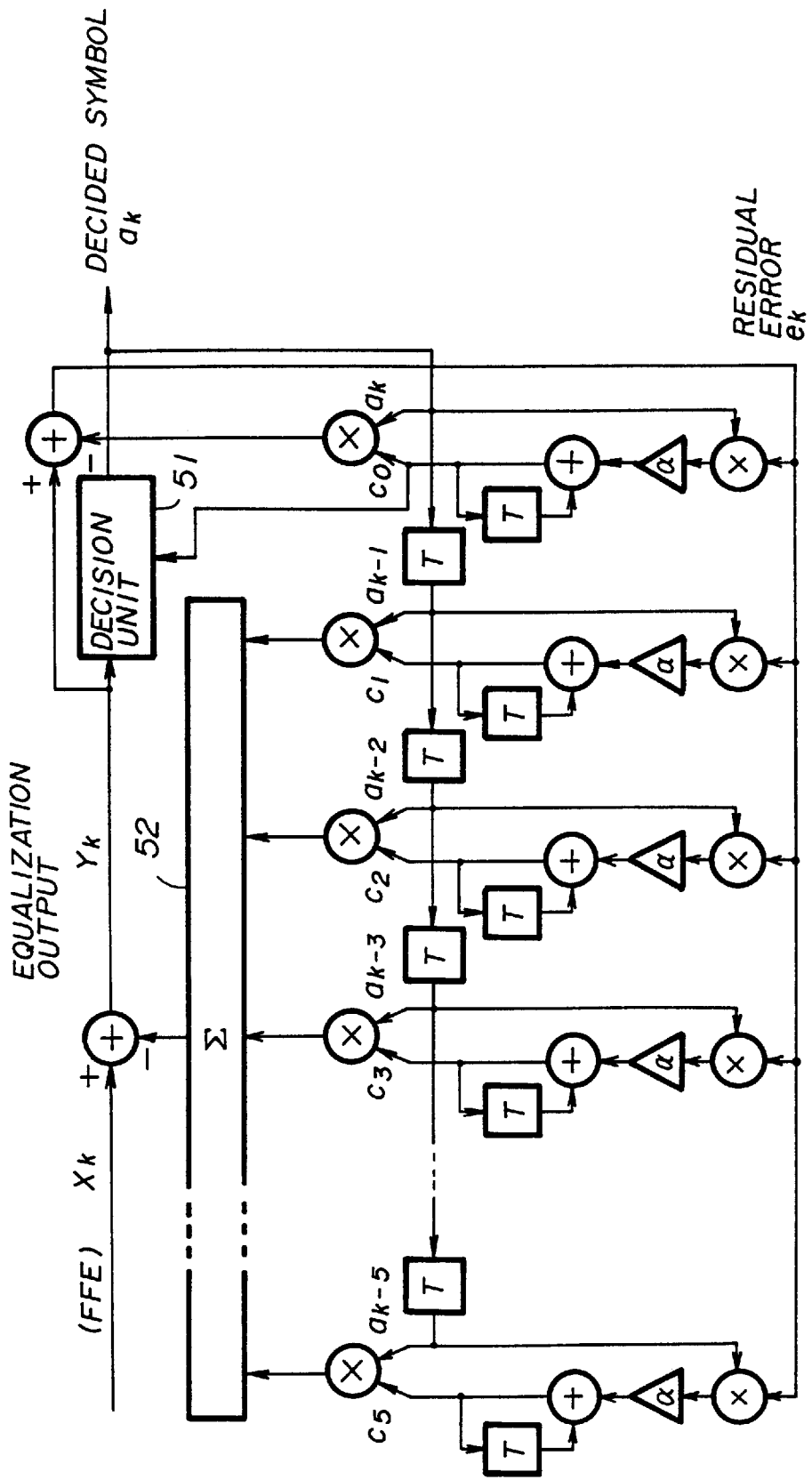
FIG. 10 is a diagram for explaining the operation of a decision feedback equalizer.

FIG. 10 shows important part of a decision feedback equalizer which may be used as the decision feedback equalizer (DFE) 126 shown in FIG. 2. The decision feedback equalizer 126 includes a decision unit 51, an adder (Σ) 52, delay elements T, multipliers x, adders +, and coefficient multipliers a which multiply values which are changed during the training sequence. FIG. 10 shows a case where a number of post cursors is 5 and a number of main cursors is 1, and for example, tap coefficients may be updated by the LMS algorithm.

A replica R(k) from the adder 52 can be described by the following.

$$R(k) = \Sigma^5_{n=0}[C_n(k) \cdot a(k-n)] \tag{2}$$

In addition, an equalization output signal Y(k) of a difference between the output signal $X_k$ of the feed forward equalizer 126 and the replica R(k) can be described by the following.

$$Y(k) = X(k) - R(k) \tag{3}$$

A residual error $e_k(k)$ can be described by the following.

$$e_k(k) = Y(k) - a(k) \cdot C_0(k) \tag{4}$$

Further, a tap coefficient $C_n(k+1)$ which is updated by the LMP algorithm can be described by the following.

$$C_n(k+1) = C_n(k) + \alpha \cdot a(k-n) \cdot e_k \tag{5}$$

In the above described formulas, n=0 to 5, the equalization output signal $Y_k$ is decided by the decision unit 51, and a decided symbol $a_k$ is output.

Figure 11:
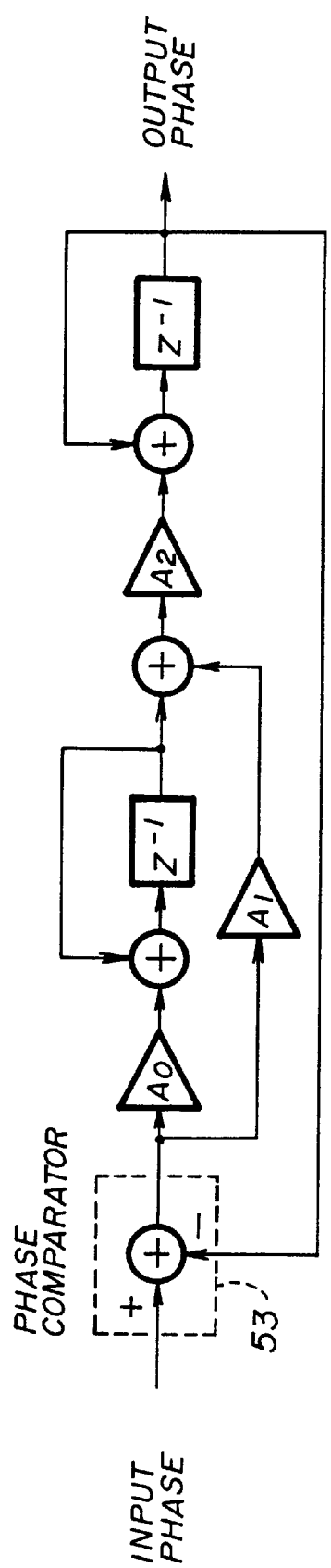
FIG. 11 is a diagram for explaining the operation of a digital PLL circuit.

FIG. 11 shows an important part of a digital PLL circuit which may be used as the digital PLL circuit (DPLL) 128 shown in FIG. 2. The digital PLL circuit 128 includes a phase comparator 53, adders +, delay circuits $Z^{-1}$, and coefficient multipliers $A_0$ through $A_2$. The coefficient multipliers $A_0$ through $A_2$ multiply values which are changed during the training sequence. An input phase and an output phase are compared by the phase comparator 53, so as to reproduce a timing signal which is synchronized to the input phase. A transfer function $H(Z^{-1})$ of this circuit can be described by the following.

$$H(Z^{-1})=[(1-Z^{-1}){\cdot}A_1{\cdot}A_2{\cdot}Z^{-1}+A_0{\cdot}A_2{\cdot}Z^{-2}]/\{(1-Z^{-1})^2+\{(1-Z^{-1}){\cdot}A_1+A_0{\cdot}Z^{-1}\}{\cdot}A_2{\cdot}Z^{-1}\} \quad (6)$$

Figure 12:
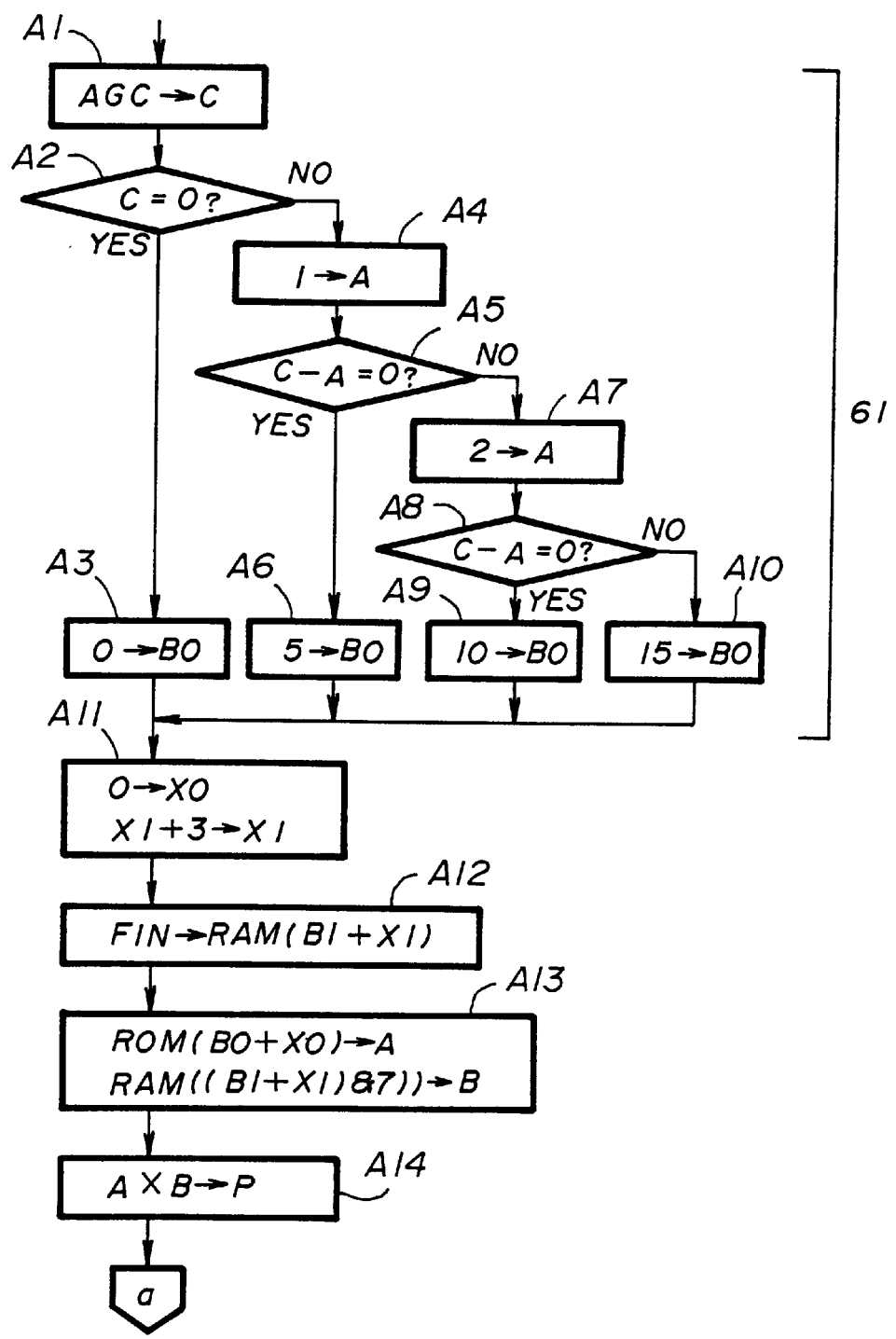
FIG. 12 is a flow chart for explaining the operation of the feed forward equalizer.
Figure 13:
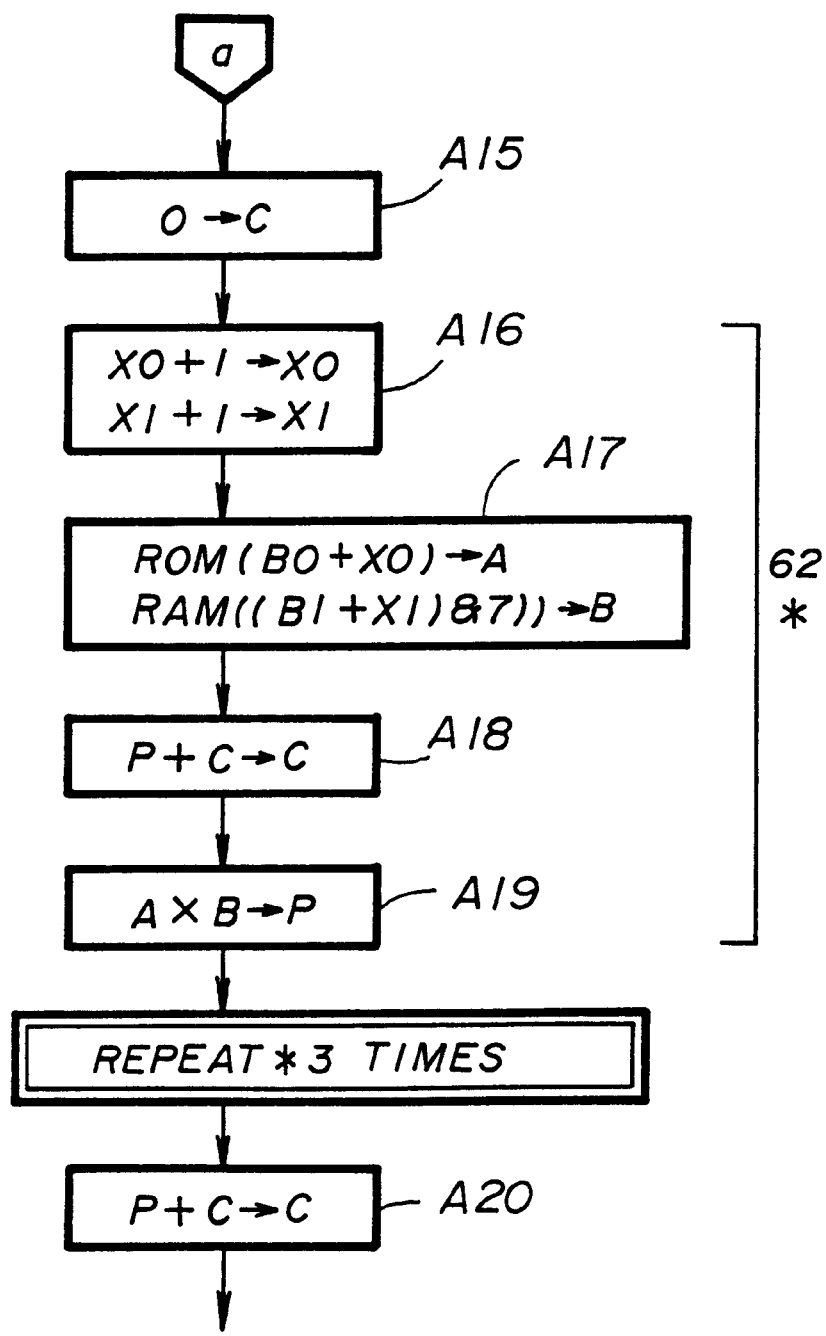
FIG. 13 is a flow chart for explaining the operation of the feed forward equalizer.

FIGS. 12 and 13 are flow charts for explaining the operation of an important part of the feed forward equalizer. More particularly, FIGS. 12 and 13 show steps Al through A20 which are carried out for every sample when realizing the functions of the feed forward equalizer shown in FIG. 9 by the DSP.

In a step A1, C is set in the accumulator C as the code AGC of the AGC part AGC, and a step A2 decides whether or not C=0. If the decision result in the step A2 is YES, a step A3 sets 0 in the register B0. On the other hand, if the decision result in the step A2 is NO, a step A4 sets 1 in the register A, and a step A5 decides whether or not C−A=0. If the decision result in the step A5 is YES, a step A6 sets 5 in the register B0. On the other hand, if the decision result in the step A4 is NO, a step A7 sets 2 in the register A, and a step A8 decides whether or not C−A=0. If the decision result in the step A8 is YES, a step A9 sets 10 in the register B0. If the decision result in the step A8 is NO, a step A10 sets 15 in the register B0.

As described above, in this embodiment, the address computing block is constructed so that the code AGC of the AGC part AGC is decoded by the decode DEC1 and input to the address computing unit AALU as shown in FIG. 8, and the above described steps A1 through A10, indicated by a step group 61, may be omitted. In other words, by omitting the step group 61 described above, it becomes possible to realize the functions of the feed forward equalizer by the DSP 18 even if the DSP 18 is not constructed to carry out a high-speed operation.

In a step A11, 0 is set in the index register X0, and 3 is added to the index register X1. A step A12 sets an input signal FIN of the feed forward equalizer at an address (B1+X1) of a memory RAM. A step A13 sets a content at an address (B0+X0) of a memory ROM in the register A, and sets an address (B1+X1) of the memory RAM and 7 in the register B. A step A14 sets a multiplication result A×B from the multiplier MPY in the register P.

Figure 3:
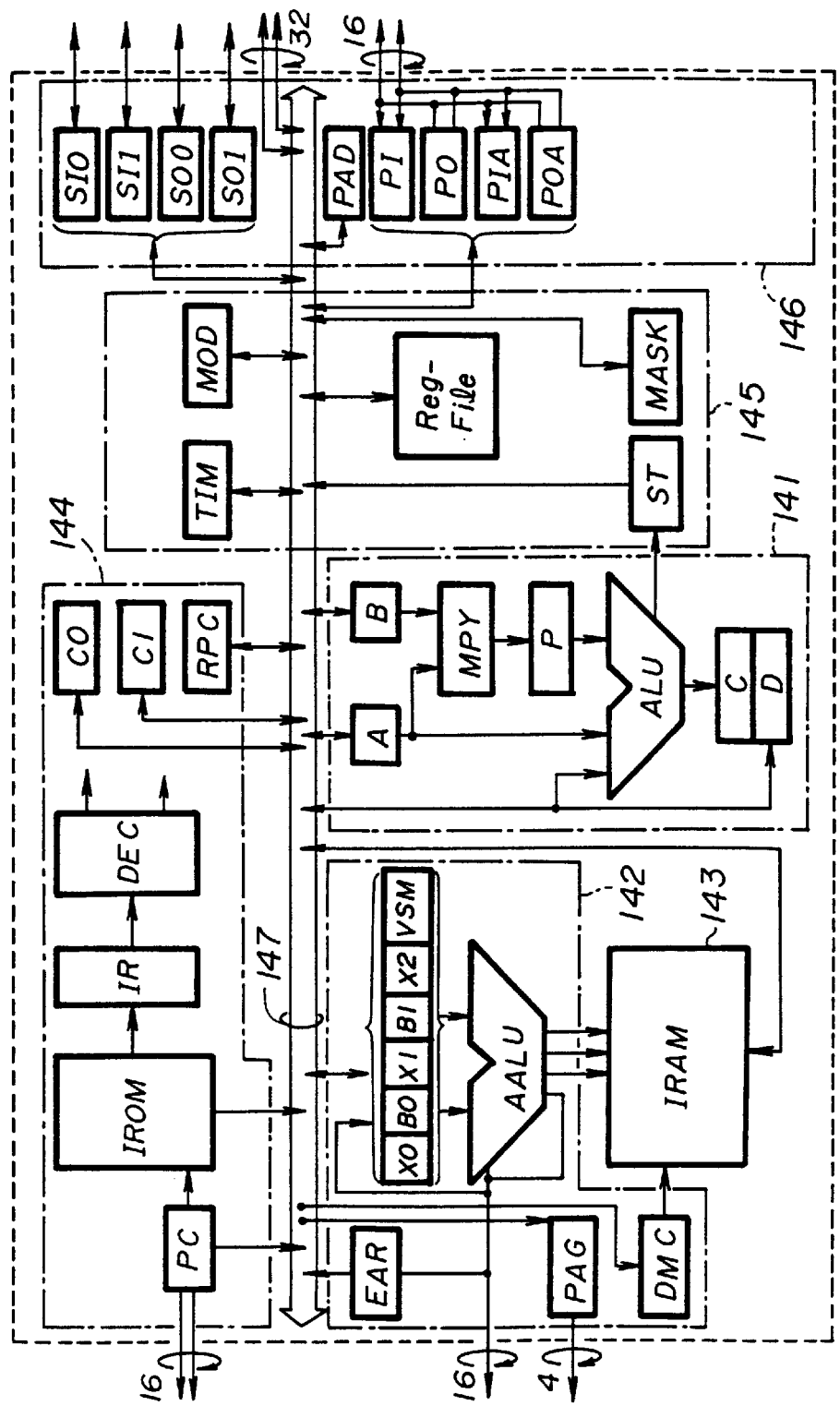
FIG. 3 is a diagram for explaining a DSP.

The memory RAM and the memory ROM are provided within the DSP 18 shown in FIG. 6 (or in FIGS. 19, 21 and 22 which will be described later). Ir the case where the DSP 18 has a construction similar to that shown in FIG. 3 described above, the memory RAM corresponds to the IRAM 143 and the memory ROM corresponds to the IROM shown in FIG. 3.

In FIG. 13, a step A15 sets 0 in the accumulator C, and a step A16 increments X0 to X0+1 and increments X1 to X1+1. A.step A17 sets a content at the address (B0+X0) of the memory ROM in the register A, and sets a content at the address (B1++X1) of the memory RAM and 7 in the register B. A step A18 sets an added result P+C to the accumulator C, and a step A19 sets a multiplication result A×B in the register P. A step group 62 made up of the steps A16 through A19 is repeated three times. Then, a step A20 sets an added result P+C to the accumulator C, and the content of this accumulator C is used as the output signal of the feed forward equalizer.

FIG. 14 shows the contents of the memory ROM, that is, the coefficient memory. In FIG. 14, F0 through F4 respectively indicate the coefficients of the coefficient multipliers shown in FIG. 9 corresponding to the codes AGC=0 to 3 of the AGC part AGC. In addition, $\alpha 0$ through $\alpha 3$ indicate parameters of the training sequence. Accordingly, the contents can be read from the memory ROM by making access to one of the addresses 20 through 23, and in this embodiment, the read content is input to the address computing unit AALU via the decoder DEC2.

FIGS. 15 through 18 are flow charts for explaining the operation of an important part of the decision feedback equalizer. More particularly, FIGS. 15 through 18 show steps B1 through B43 which are carried out for every sample when realizing the functions of the decision feedback equalizer shown in FIG. 10 by the DSP.

Figure 15:
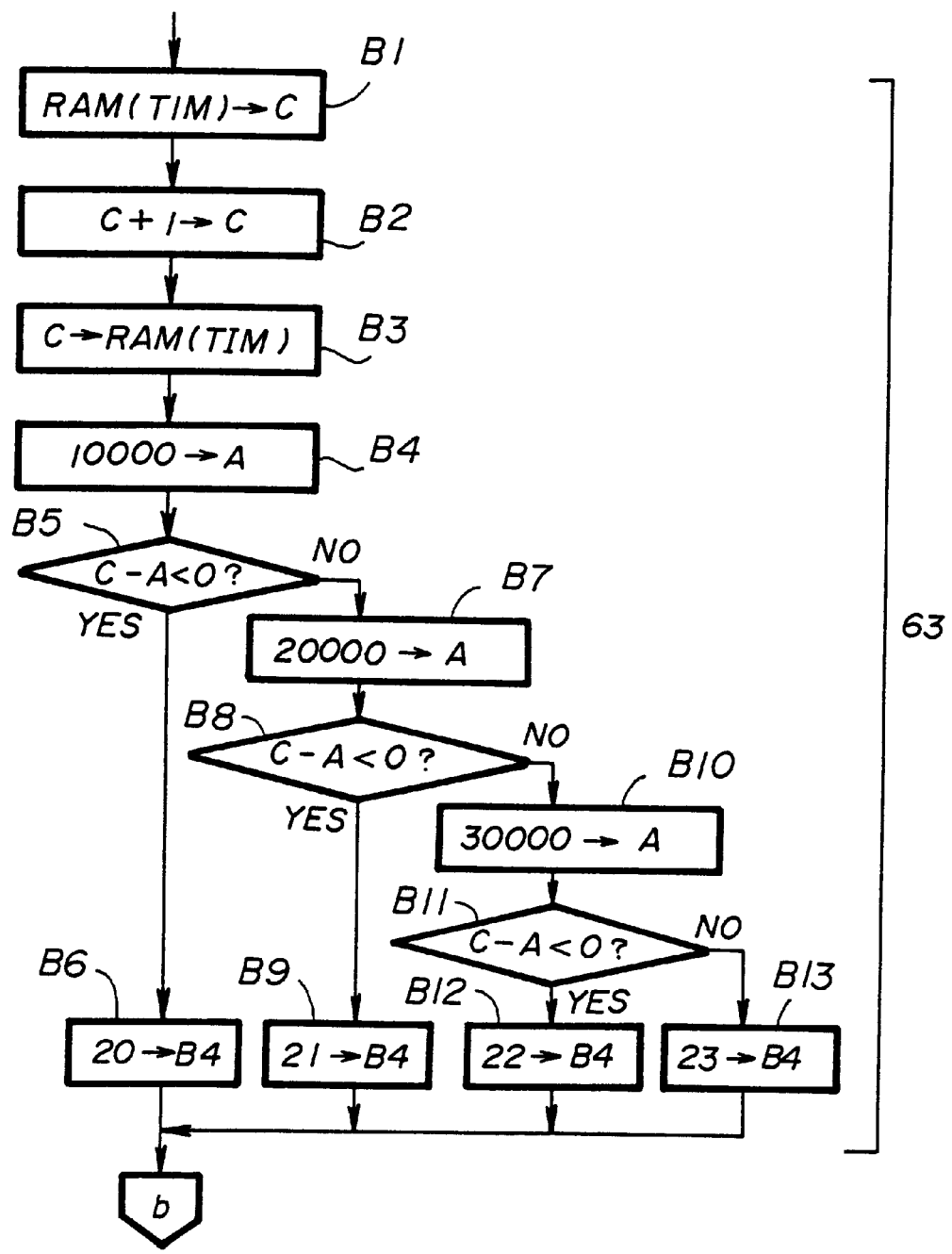
FIG. 15 is a flow chart for explaining the operation of the decision feedback equalizer.

In FIG. 15, a step B1 sets a content of a timer counter TIM of the memory RAM in the accumulator C, and a step B2 increments C to C+1. A step B3 stores the content of the accumulator C in the timer counter TIM of the memory RAM.

A step B4 sets 10000 in the register A, and a step B5 decides whether or not C−A<0. If the decision result in the step B5 is YES, a step B6 sets 20 in a register B4 shown in FIG. 8. On the other hand, if the decision result in the step B5 is NO, a step sets 2000 in the register A, and a step B8 decides whether or not C−A<0. If the decision result in the step B8 is YES, a step B9 sets 21 in the register B4. If the decision result in the step B8 is NO, a step B10 sets 30000 in the register A, and a step B11 decides whether or not C−A<0. If the decision result in the step B11 is YES, a step B12 sets 22 in the register B4. If the decision result in the step B11 is NO, a step B13 sets 23 in the register B4.

Accordingly, the access to the addresses 20 through 23 of the memory ROM shown in FIG. 14 can be made by the content of the register B4 shown in FIG. 8 A step group 63 which is made up of the steps B1 through B13 is carried out during the training sequence of the timer counter TIM. In this embodiment, the content during the training sequence indicated by the sequence controller SEQ can be decoded by the decoder DEC2 and input to the address computing unit AALU as shown in FIG. 8. Hence, the step group 63 of the timer counter TIM may be omitted.

Figure 16:
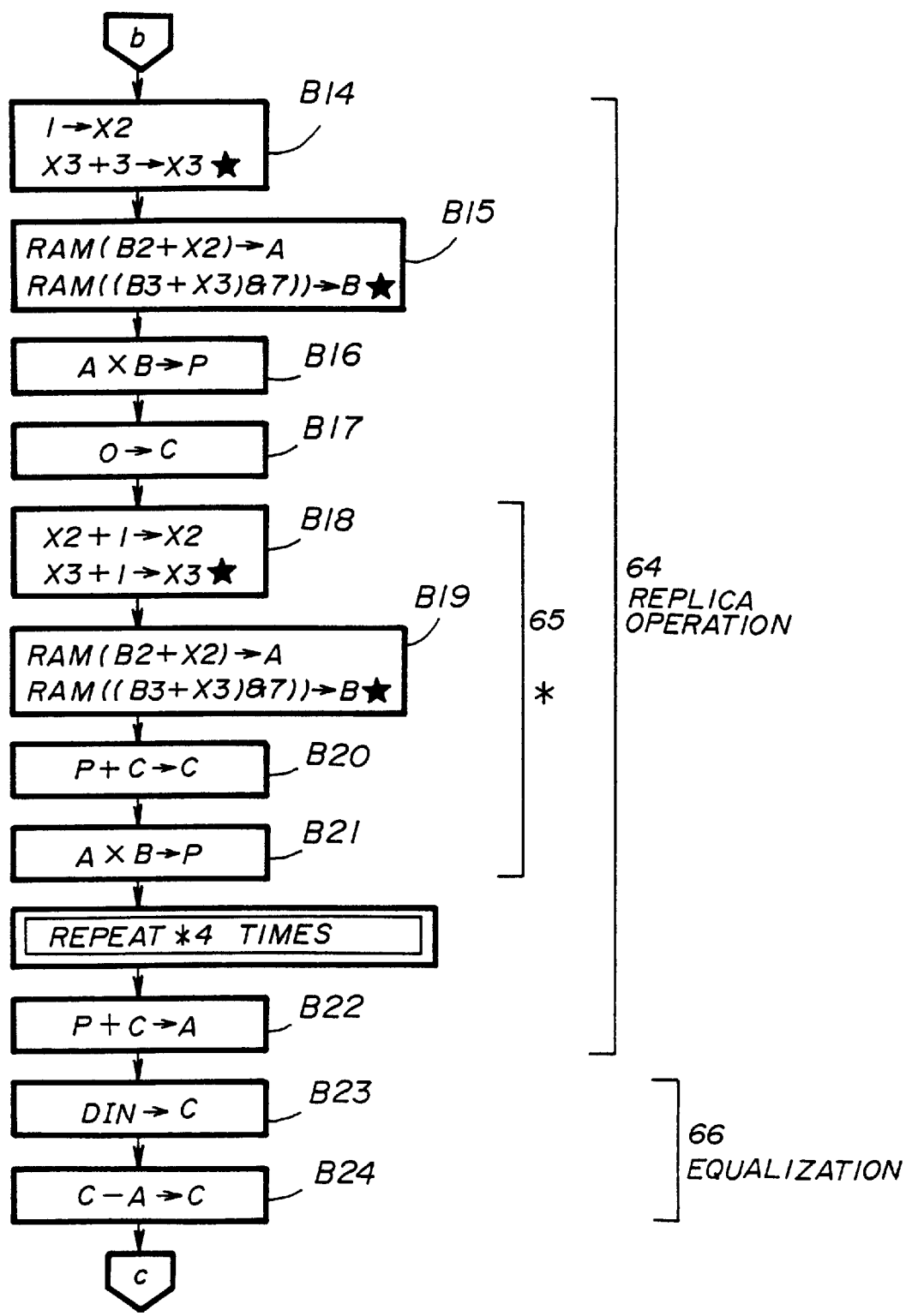
FIG. 16 is a flow chart for explaining the operation of the decision feedback equalizer.

In FIG. 16, a step B14 sets 1 in the register X2 and X3+3 in the register X3. A step B15 sets the content of an address (B2+X2) of the memory RAM in the register A, and sets the content at an address (B3+X3) of the memory RAM and 7 in the register B. A step B16 carries out a multiplication A×B and sets the multiplication result in the register P. A step B17 sets 0 in the accumulator C. A step group 65 made up of next steps B18 through B21 is repeated four times, and a replica operation is carried out by a step group 64 which is made up of the steps B14 through B22 including the step group 65.

More particularly, the step B18 increments X2 to X2+1, and increments X3 to X3+1. The step B19 sets the content at the address (B2+X2) of the memory RAM in the register A, and sets the content at the address (B3+X3) of the memory RAM and 7 in the register B. The step B20 sets P+C in the accumulator C, and the step B21 carries out a multiplication A×B and sets the multiplication result in the register P. The step B22 sets P+C in the register A.

A step B23 sets an input signal DIN of the decision feedback equalizer in the accumulator C. A step B24 subtracts a replica signal from the input signal DIN, and sets C−A in the accumulator C. The content of the accumulator C is used as an output equalization signal of the decision feedback equalizer. In other words, a step group 66 made up of the steps B23 and B24 performs the equalizing process.

Figure 17:
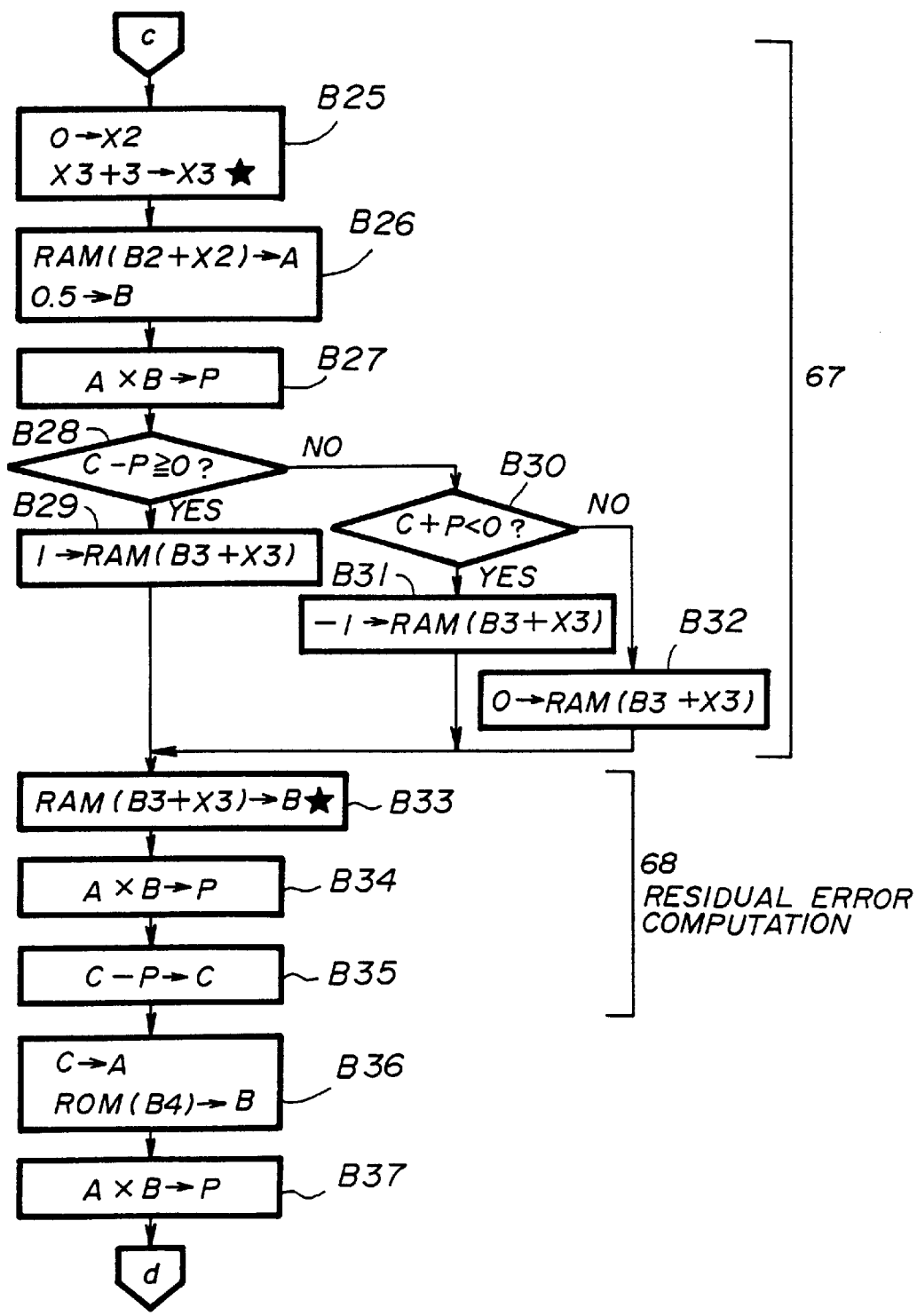
FIG. 17 is a flow chart for explaining the operation of the decision feedback equalizer.
Figure 18:
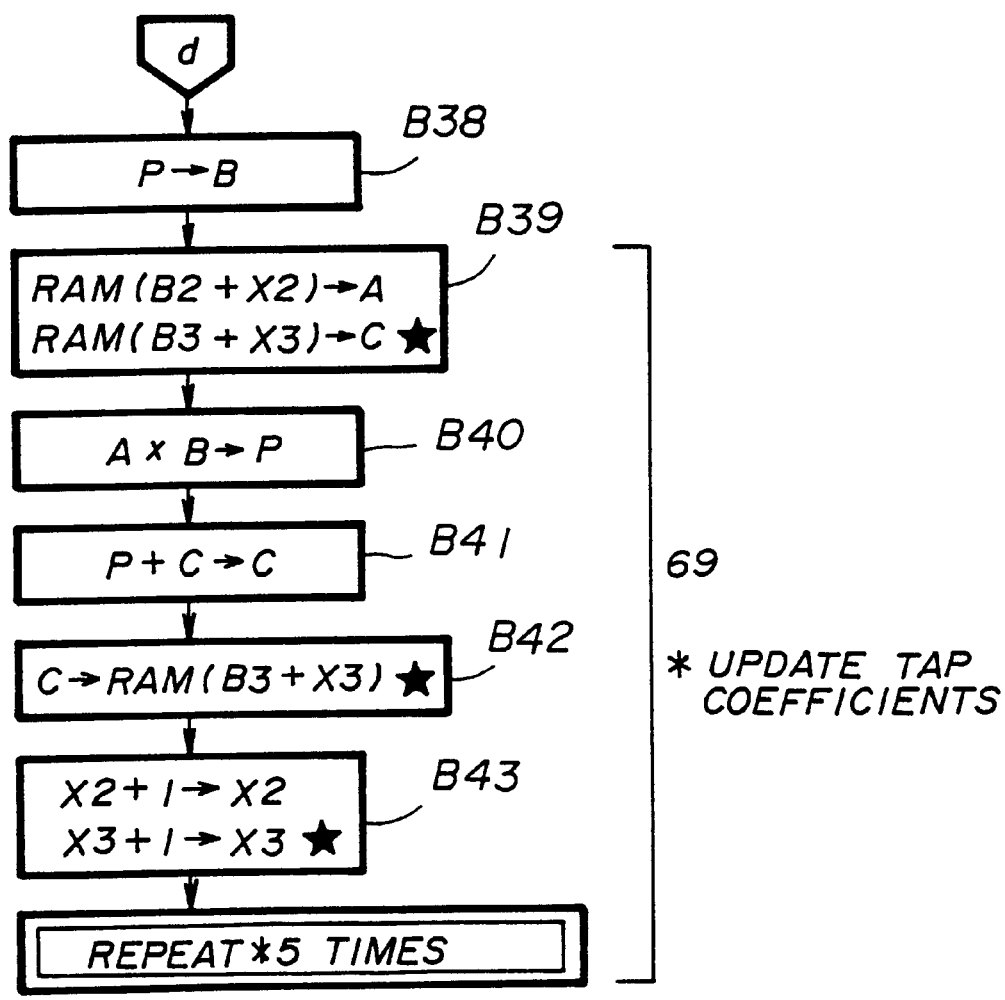
FIG. 18 is a flow chart for explaining the operation of the decision feedback equalizer.

In FIG. 17, a step group 67 made up of steps B25 through B32 decides a received symbol. More particularly, the step B25 sets 0 in the register X2, and sets X3+3 in the register X3. The step B26 sets the content at the address (B2+X2) of the memory RAM in the register A, and sets 0.5 in the register B. The step B27 carries out a multiplication A×B, and sets the multiplication result in the register P. The step B28 decides whether or not C−P≧0, and the step B29 sets 1 at the address (B3+X3) of the memory RAM if the decision result in the step B28 is YES. ON the other hand, if the decision result in the step B28 is NO, the step B30 decides whether or not C+P<0. If the decision result in the step B30 is YES, the step B31 sets −1 at the address (B3+X3) of the memory RAM. If the decision result in the step B30 is NO, the step B32 sets 0 at the address (B3+X3) of the memory RAM. In other words, the steps B28 and B30 are carried out to judge whether the symbol is 1, −1 or 0.

In this case, the symbol is coded, and the number of bits representing the symbol is small. Hence, the judged symbol is stored in the symbol shift register SSR shown in FIG. 7. Since this symbol shift register SSR is connected to the bus BUS, it is possible to make a reference to the judged symbol which is shifted and stored in the symbol shift register SSR by carrying out an address control. In other words, it is possible to omit a shift operation using the memory RAM.

A step group 68 made up of steps B33 through B35 computes the residual error. More particularly, the step B33 sets the content at the address (B3+X3) of the memory RAM in the register B. The step B34 carries out a multiplication A×B, and sets the multiplication result in the register P. The step B35 sets C−P in the accumulator C.

Then, a step B36 sets the residual error in the accumulator C in the register A, and sets the content at the address B4 of the memory ROM in the register B. A step B37 carries out a multiplication A×B by the multiplier MPY, and sets the multiplication result in the register P. In addition, a step B38 shown in FIG. 18 sets the contents of the register P in the register B, and a step group 69 which is made up of steps B39 through B43 updates the tap coefficients. This step group 69 is repeated five times.

More particularly, the step B39 sets the content at the address (B2+X2) of the memory RAM in the register A, and sets the content at the address (B3+X3) of the memory RAM in the register C. The step B40 carries out a multiplication A×B, and sets the multiplication result in the register P. The step B41 sets C at the address (B3+X3) of the memory RAM. The step B43 increments the register X2 to X2+1, and also increments the register X3 to X3+1.

In the computation indicated by a star mark in each of the steps B14, B15, B18, B19, B25, B33, B39, B42 and B43 described above, a process such as obtaining the content at the address (B3+X3) of the memory RAM may be replaced by a process of making a reference via the bus BUS to the judged symbol stored in the symbol shift register SSR. Accordingly, it is possible to adapt the DSP which is used with respect to the analog subscriber circuit to the signal processing of the digital subscriber circuit.

Figure 19:
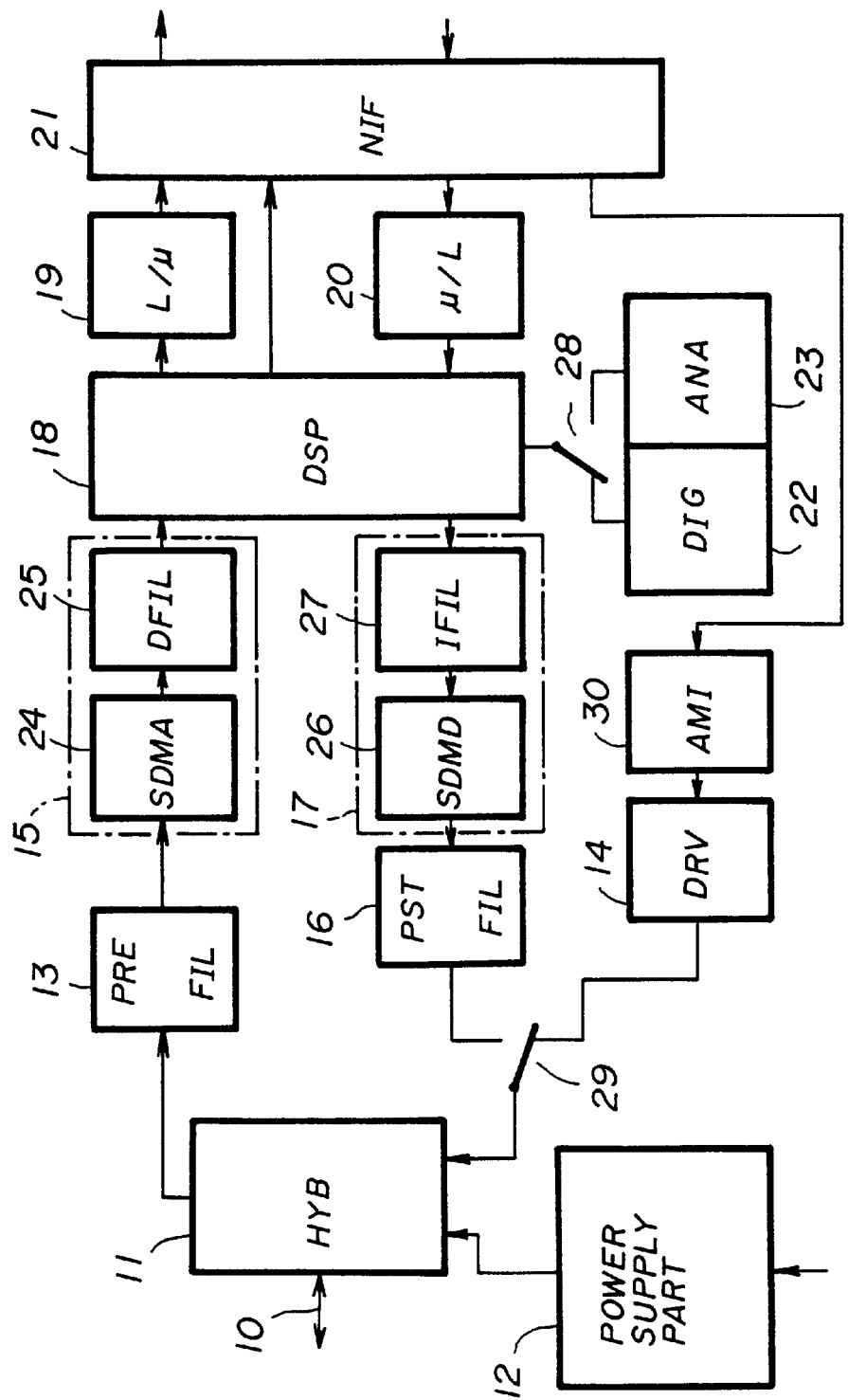
FIG. 19 is a system block diagram showing a third embodiment of the analog/digital integrated subscriber circuit according to the present invention.

FIG. 19 shows a third embodiment of the analog/digital integrated subscriber circuit according to the present invention. In FIG. 19, those parts which are the same as those corresponding parts in FIG. 6 are designated by the same reference numerals, and a description thereof will be omitted. This embodiment includes a switch 29 and an AMI decoder (AMI) 30.

A receiving part obtains a received signal via the hybrid circuit 11, and inputs the received signal to the DSP 18 via the pre-filter 13 and the A/D converter 15. A first transmitting part for the analog subscriber includes the D/A converter 17 which receives a transmitting signal which is processed by the DSP 18, and the post-filter 16. A second transmitting part for the digital subscriber includes the AMI decoder 30 which receives a transmitting signal which is obtained via the network interface circuit 21, and the driver 14. The first transmitting part for the analog subscriber and the second transmitting part for the digital subscriber are switched and connected with respect to the hybrid circuit 11 via the switch 29.

If the subscriber line 10 is a digital subscriber line, the switches 28 and 29 are switched to the state shown in FIG. 19, and the power supply characteristic of the power supply part 12 is switched to the constant current characteristic. In addition, similarly to the embodiment described above, the DSP 18 is constructed so that the symbol shift register SSR is provided in the computing block, and in an analog computing block, a code or the like during the training sequence of the sequence controller SEQ and the AGC part AGC is decoded and input to the address computing unit AALU.

On the other hand, if the subscriber line 10 is an analog subscriber line, the switches 28 and 29 are switched to the other contacts in FIG. 19, and the power supply characteristic of the power supply part 12 is switched to the constant voltage characteristic In addition, a voice signal from the subscriber is input to the DSP 18 via the post-filter 16 and the A/D converter 17. In this embodiment, it is possible to construct the post-filter 16 and the A/D converter 17 to be used for the digital subscriber. In this case, instead of switching the sampling frequencies of the post-filter 16 and the A/D converter 17, the sampling frequency is switched from the DSP 18.

Figure 20:
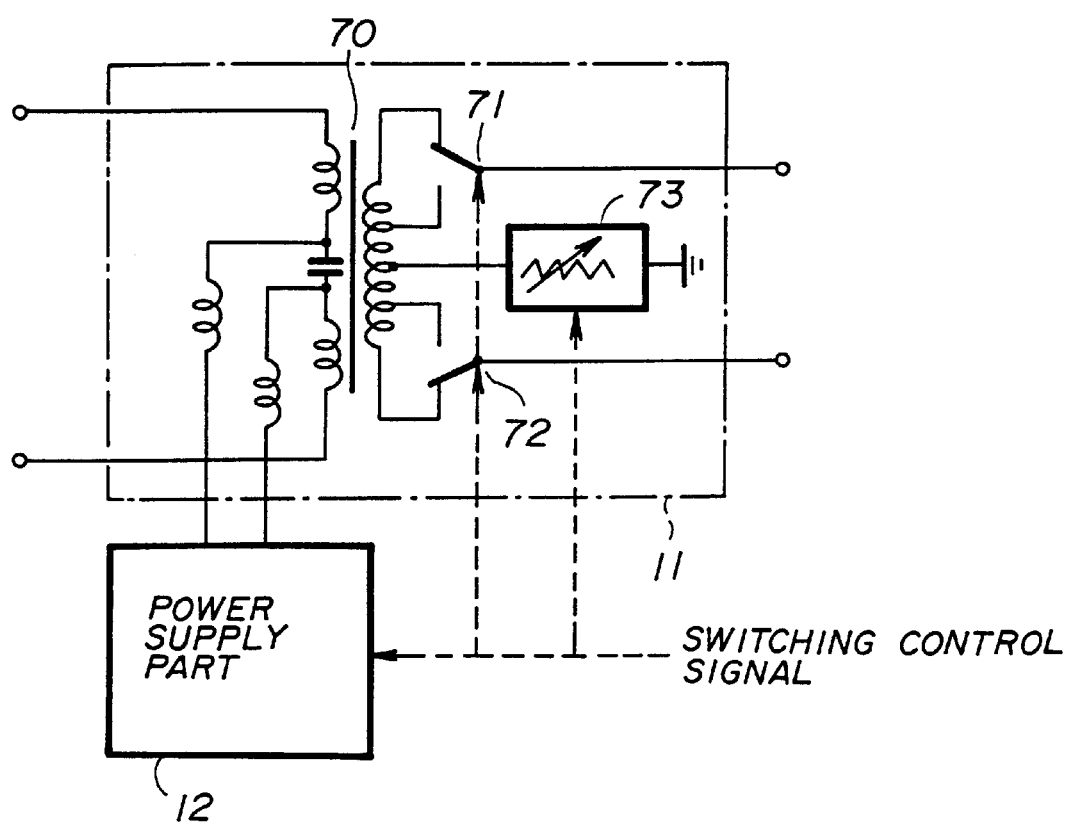
FIG. 20 is a diagram showing an important part of a hybrid circuit of a fourth embodiment of the analog/digital integrated subscriber circuit according to the present invention.

FIG. 20 shows an important part of a hybrid circuit of a fourth embodiment the an analog/digital integrated subscriber circuit according to the present invention. In FIG. 20, the power supply part 12 is connected to the subscriber line side of a hybrid transformer 70, and a tap is provided on the winding on the signal processing part side. The turn ratio of the windings is switched in response to switching control signals corresponding to the digital subscriber line and the analog subscriber line, by the switching made by switches 71 and 72. In addition, the impedance value of a terminating impedance 73 is switched in response to the switching control signal. Furthermore, the power supply characteristic of the power supply part 12 is also switched as described above.

The terminating impedance of the analog subscriber line is normally 600 Ω+1 $\mu$F. On the other hand, the terminating impedance of the digital subscriber line is normally 110 Ω. Accordingly, the impedance value of the terminating impedance 73 is switched in response to the switching control signal to suit the subscriber line that is connected to the system. The switching of the impedance value of the terminating impedance 73 can easily be made by switching the circuit network using a resistor and a capacitor. In addition, since the required signal level generally differs between the analog subscriber line and the digital subscriber line, the number of turns of the winding of the hybrid transformer 70 is switched to suit the subscriber line that is connected to the system. The number of turns of the winding of the hybrid transformer 70 can also be switched by providing a tap on the winding on the subscriber line side. Therefore, it is possible to use the hybrid circuit 11 in common with respect to the digital subscriber line and the analog subscriber line by switching the characteristic of the hybrid circuit 11 depending on whether the digital subscriber line or the analog subscriber line is connected to the system.

Figure 21:
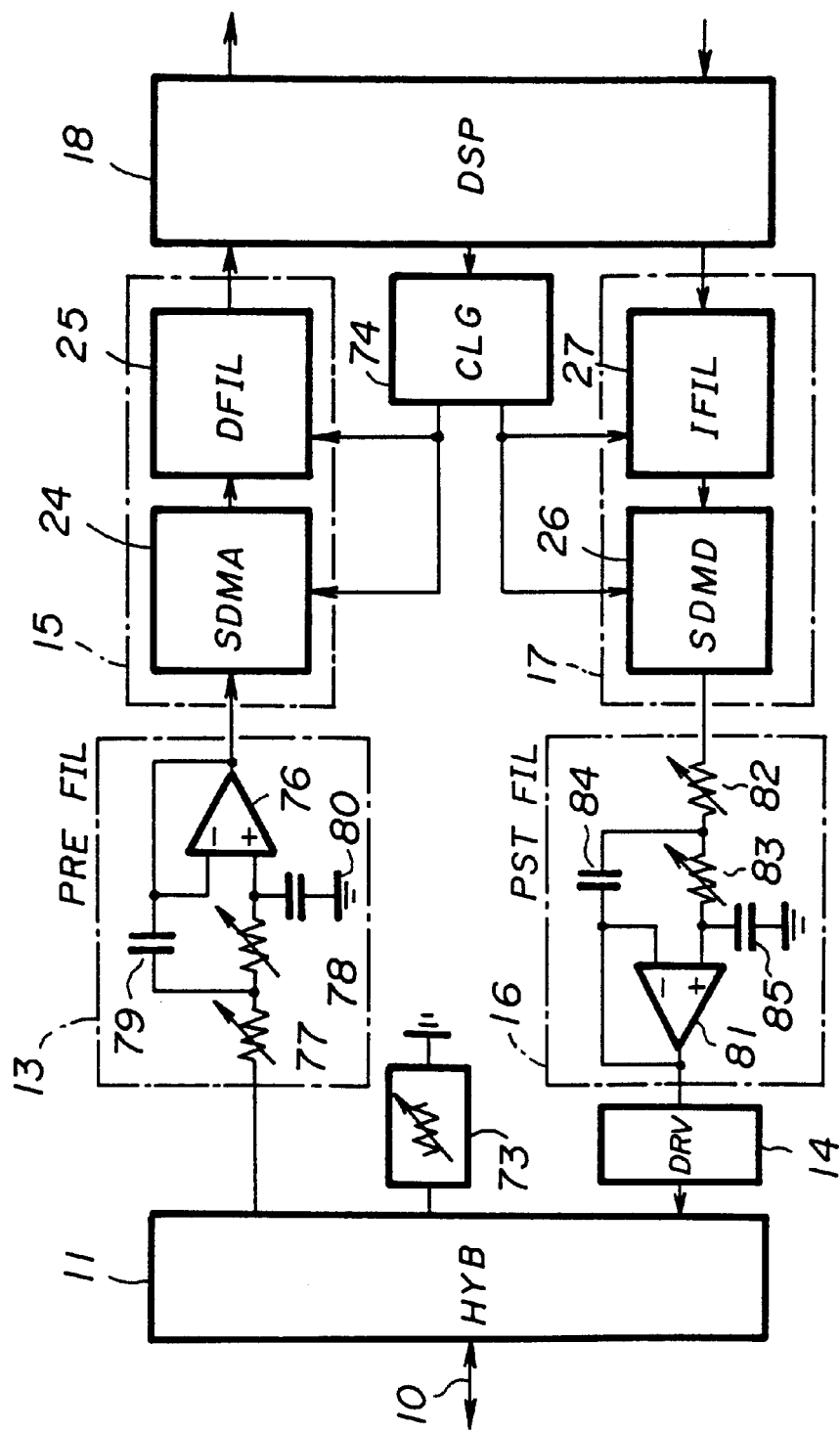
FIG. 21 is a diagram showing an important part of a signal processing part of a fifth embodiment of the analog/digital integrated subscriber circuit according to the present invention.

FIG. 21 shows an important part of a signal processing part of a fifth embodiment of the analog/digital integrated subscriber circuit according to the present invention. In FIG. 21, those parts which are the same as those corresponding parts in FIG. 6 are designated by the same reference numerals, and a description thereof will be omitted. In this embodiment, the terminating impedance 73, a clock generator (CLG) 74, operational amplifiers 76 and 81, resistors 77, 78, 82 and 83, and capacitors 79, 80, 84 and 85 are connected as shown in FIG. 21.

The pre-filter 13 and the post-filter 16 may have a RC active filter structure shown in FIG. 21, for example. In this case, it is possible to switch the cutoff frequencies or the like by switching the circuit constants such as the resistance values of the resistances 77, 78, 82 and 83. Accordingly, by switching the circuit constants such as the resistance values depending on the band that is necessary with respect to the digital subscriber line and the analog subscriber line, it is possible to obtain a desired characteristic and to use a main part of the circuit in common with respect to the digital subscriber line and the analog subscriber line.

Clock signals from the clock generator 74 are supplied to the D/A converter 15 and the A/D converter 17. For example, in the $\Sigma/_\Delta$ modulator 24, the sampling frequency is switched to 15 MHz with respect to the digital subscriber line and is switched to 2 MHz with respect to the analog subscriber line. Hence, the frequencies of the clock signals supplied from the clock generator 74 are switched depending on whether the digital subscriber line or the analog subscriber line is connected to the system. Such a switching of the clock signal frequency may easily be made by use of a frequency divider circuit or the like.

The clock signal supplied to the D/A converter 15 from the clock generator 74 and the clock signal supplied to the A/D converter 17 from the clock generator 74 may have the same frequency. However, it is possible to make the frequency of the clock signal supplied to the A/D converter 17 lower than the frequency of the clock signal supplied to the D/A converter 15. By switching the characteristics of the terminating impedance 73, the pre-filter 13 and the post-filter 16, and also switching the frequencies of the clock signals supplied to the D/A converter 15 and the A/D converter 17, it is possible to use a main part of the circuit in common with respect to the digital subscriber line and the analog subscriber line.

Figure 22:
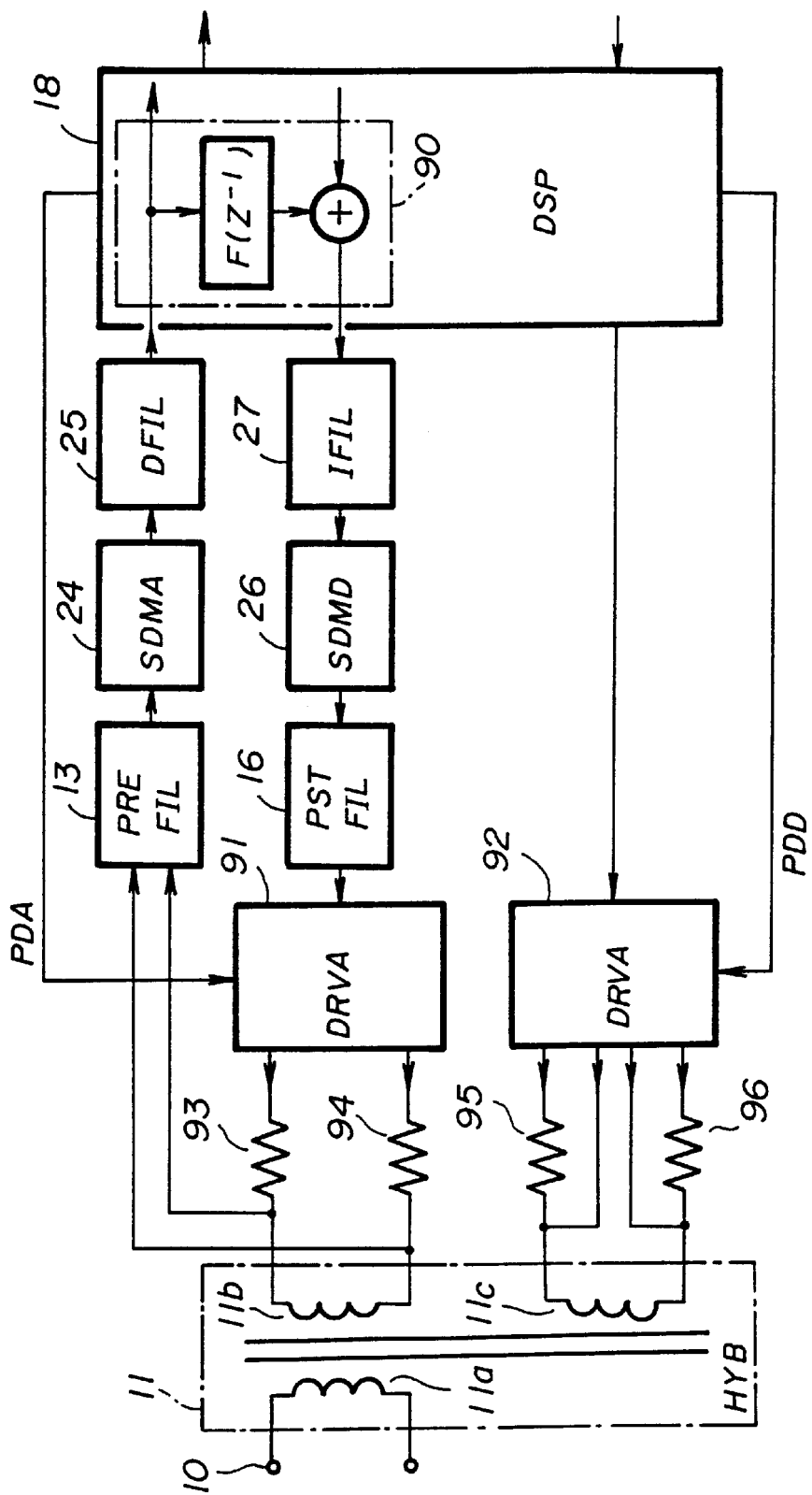
FIG. 22 is a diagram showing an important part of a signal processing part of a sixth embodiment of the analog/digital integrated subscriber circuit according to the present invention.

FIG. 22 shows an important part of a signal processing part of a sixth embodiment of the analog/digital integrated subscriber circuit according to the present invention. In FIG. 22, those parts which are the same as those corresponding parts in FIG. 6 are designated by the same reference numerals, and a description thereof will be omitted.

In this embodiment, the hybrid circuit 11 includes first through third windings 11a through 11c A terminating part 90, an analog subscriber driver (DRVA) 91, a digital subscriber driver (DRVD) 92, and resistors 93 through 96 are connected as shown. PDA and PDD denote power down control signals. In FIG. 22 the illustration of the power supply part 12, the linear $\mu$ converter 19, the $\mu$ linear converter 20, the network interface circuit 21, the digital subscriber firmware 22 and the analog subscriber firmware 23 shown in FIG. 6 is omitted.

A receiving part inputs the received signal which is obtained via the hybrid circuit 11 to the DSP 18 via the pre-filter 13, the $\Sigma/_\Delta$ modulator 24 and the decimation filter 25. A first transmitting part for the analog subscriber inputs a transmitting signal which is processed by the DSP 18 to the hybrid circuit 11 via the interpolation filter 27, the $\Sigma/_\Delta$ modulator 26, the post-filter 16 and the analog subscriber driver 91. A second transmitting part for the digital subscriber inputs a transmitting signal which is processed by the DSP 18 to the hybrid circuit 11 via the digital subscriber driver 92. The second transmitting part for the digital subscriber may be constructed as show in FIG. 19 to include the AMI decoder 30 and the driver 14 for inputting the transmitting signal obtained via the network interface circuit 21.

When the analog subscriber line is connected to the hybrid circuit 11, the DSP 18 controls the analog subscriber driver 91 to an active state by the power down control signal PDA, and controls the digital subscriber driver 92 to the power down state by the power down control signal PDD. On the other hand, when the digital subscriber line is connected to the hybrid circuit 11, the DSP 18 controls the analog subscriber driver 91 to a power down state by the power down control signal PDA, and controls the digital subscriber driver 92 to the active state by the power down control signal PDD.

When the analog subscriber line is connected to the hybrid circuit 11, the DSP 18 generates a signal having a waveform that can be represented by a function $F(Z^{-1})$ or the like, for example, and carries out a process of adding this signal to the transmitting signal, so that the terminating impedance with respect to the analog subscriber line becomes 600 Ω+1 μF, for example.

Figure 23A:
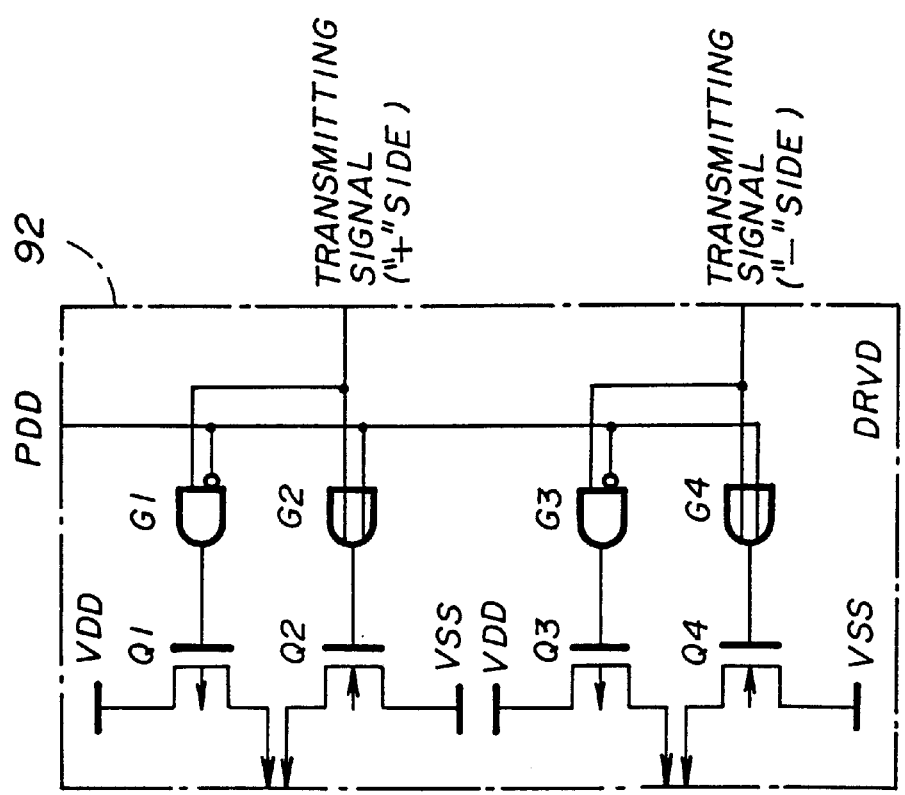
FIGS. 23A and 23B respectively are diagrams for explaining drivers of the sixth embodiment.
Figure 23B:
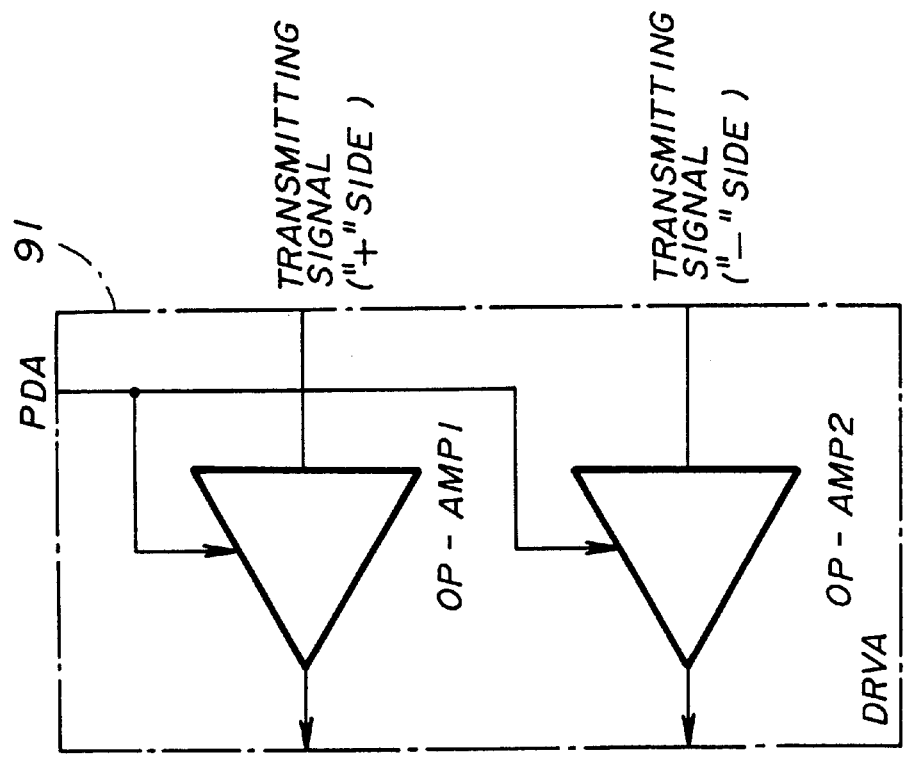

FIGS. 23A and 23B respectively show important parts of the drivers of the sixth embodiment. FIG. 23A shows the digital subscriber driver 92 shown in FIG. 22, and FIG. 23B shows the analog subscriber driver 91 shown in FIG. 22.

The digital subscriber driver 92 shown in FIG. 23A includes p-type field effect transistors (FETs) Q1 and Q3, n-type FETs Q2 and Q4, and gate circuits G1 through G4 which are connected as shown. VDD and VSS denote power supply voltages, and for example, VDD=+6 V and VSS=0 V.

The analog subscriber driver 91 shown in FIG. 23B includes operational amplifiers OP-AMP1 and OP-AMP2 which are connected as shown.

In a case where the power down control signal PDD from the DSP 18 has a value "0" (or a low level), the transmitting signal on the positive side is input to the gate of the FET Q1 via the gate circuit G1 on one hand, and is input to the gate of the FET Q2 via the gate circuit G2 on the other. In addition, the transmitting signal on the negative side is input to the gate of the FET Q3 via the gate circuit G3 on one hand, and is input to the gate of the FET Q4 via the gate circuit G4 on the other. Accordingly, output signals of the FETs Q1 and Q2 are applied across both ends of the resistor 95, and output signals of the FETs Q3 and Q4 are applied across both ends of the resistor 96. As a result, the transmitting signal is applied to the third winding 11c of the hybrid transformer, and the digital subscriber driver 92 is put into the active state.

When the digital subscriber driver 92 assumes the active state, the power down control signal PDA from the DSP 18 assumes a value "1" (or a high level), and outputs of the operational amplifiers OP-AMP1 and OP-AMP2 of the analog subscriber driver 91 assume high-impedance states. In other words, the analog subscriber driver 91 is put into the power down state. In this case, various control means may be used to suit the construction of the operational amplifiers OP-AMP1 and OP-AMP2, and for example, the output impedance can be made high by controlling the gain close to zero. Thus, the output of the analog subscriber driver 91 which is coupled to the second winding 11b of the hybrid transformer via the resistors 93 and 94 assumes a high-impedance state, and a pseudo disconnection of the first transmitting part for the analog subscriber is made. Therefore, in this state, the receiving part and the second transmitting part for the digital subscriber are connected to the hybrid transformer.

The receiving part which includes the pre-filter 13, the $\Sigma/_\Delta$ modulator 24, the decimation filter 25 and the DSP 18 can function as a subscriber circuit with respect to the digital subscriber line by switching the receiving part to a controlled state for the time when the digital subscriber line is connected to the system.

On the other hand, when the analog subscriber line is connected to the system as the subscriber line 10, the DSP 18 outputs the power down signal PDD having the level "1" (high level) with respect to the digital subscriber driver 92 and outputs the power down control signal PDA having the level "0" (low level) with respect to the analog subscriber driver 91. Hence, the analog subscriber driver 91 is controlled to the active state, and the operational amplifiers OP-AMP1 and OP-AMP2 input the transmitting signals on the positive and negative sides to the second winding 11b of the hybrid transformer via the resistors 93 and 94. In addition since the output signals of the gate circuits GI and G3 maintain the level "0" and the output signals of the gate circuits G2 and G4 maintain the level "1" in the digital subscriber driver 92, the FETs Q1 through Q4 turn OFF and the digital subscriber driver 92 assumes a high-impedance state with respect to the third winding 11c of the hybrid transformer. As a result, a pseudo disconnection of the second transmitting part for the digital subscriber is made with respect to the hybrid transformer. Therefore, the first transmitting part for the analog subscriber can function as a subscriber circuit with respect to the analog subscriber line.

The receiving part which includes the pre-filter 13, the $\Sigma/$ modulator 24, the decimation filter 25 and the DSP 18 can function as a subscriber circuit with respect to the analog subscriber line by switching the receiving part to a controlled state for the time when the analog subscriber line is connected to the system. In this case, the DSP 18 carries out a process of adding a signal having a waveform which is formed based on the received signal, so that a predetermined terminating impedance is obtained with respect to the analog subscriber line using the functions of the terminating part 90.

According to this embodiment, a switching can be made with respect to the hybrid circuit 11 to suit the analog subscriber line or the digital subscriber line, by controlling the analog subscriber driver 91 and the digital subscriber driver 92 to the active state or the power down state depending on the power control signals PDA and PDD.

Of course, an arbitrary combination of the above described embodiments is possible so as to use a main part of the subscriber circuit in common with respect to the digital subscriber line and the analog subscriber line. In addition, by controlling the switching means by a remote control or the like, it is possible to easily cope with the increase and removal of the subscriber line as well as the change of the analog subscriber line to the digital subscriber line or vice versa. Moreover, in the case where the subscriber circuit is used as a subscriber circuit with respect to the digital subscriber line, the transmission system can be switched between the echo cancelling transmission system and the ping-pong transmission system by switching the processing operation of the DSP.

Further, the present invention is not limited to these embodiments, but various variations and modifications may be made without departing from the scope of the present invention.

What is claimed is:

1. An analog/digital integrated subscriber circuit comprising:
   a power supply part supplying power with respect to a subscriber line; and
   a signal processing part carrying out a signal processing;
   said power supply part including a D.C./D.C. converter controlling a switching operation thereof by detecting an output voltage and an output current supplied to the subscriber line,
   said D.C./D.C. converter comprising switching means for carrying out the switching operation by switching a power supply characteristic of said power supply part to a constant current characteristic up to a maximum output voltage when the subscriber line is a digital subscriber line and to a constant voltage characteristic having a voltage lower than the maximum output voltage when the subscriber line is an analog subscriber line.

2. The analog/digital integrated subscriber circuit as claimed in claim 1, wherein said D.C./D.C. converter further comprises:
   a D.C. power supply supplying a D.C. current;
   a transformer having primary and secondary windings;
   a switching transistor controlled ON/OFF to control a supply of the D.C. current from said D.C. power supply to the primary winding of said transformer;
   a rectifying and smoothing part rectifying and smoothing a voltage induced at the secondary winding of said transformer and supplying an output voltage to the subscriber line;
   a voltage detector detecting the output voltage of said rectifying and smoothing part and outputting a first detection signal;
   a current detector detecting an output current of said rectifying and smoothing part and outputting a second detection signal; and
   a pulse width controller controlling an ON-time of said switching transistor based on the first and second detection signals,
   said switching means switching a detection value of said voltage detector between a case where the power is supplied to the digital subscriber line and case where the power is supplied to the analog subscriber line, so that the power supply characteristic of said power supply part is switched to the constant current characteristic when supplying the power with respect to the digital subscriber line and to the constant voltage characteristic when supplying the power with respect to the analog subscriber line.

3. The analog/digital integrated subscribe circuit as claimed in claim 1, which further comprises:
   a hybrid circuit coupled to said signal processing part and the subscriber line; and
   a network interface circuit coupled to said signal processing part,
   wherein said signal processing part comprises:
     a digital signal processor processing a signal input from the subscriber line via said hybrid circuit and a signal input via said network interface circuit; and
     a digital subscriber firmware and an analog subscriber firmware which are switched depending on whether the subscriber line is a digital subscriber line or an analog subscriber line,
     said digital signal processor including a computing block provided with a symbol shift register which shifts a judged symbol.

4. The analog/digital integrated subscriber circuit as claimed in claim 1, wherein said signal processor part comprises a digital signal processing including an address computing block, said address computing block being provided with a sequence controller, an automatic gain control part and a decoder which decodes contents of the sequence controller and the automatic gain control part and inputs decoded contents to the address computing block.

5. The analog/digital integrated subscribe circuit as claimed in claim 1, which further comprises:
   a hybrid circuit coupled to said signal processing part and the subscriber line,
   said hybrid circuit including means for switching a terminating impedance with respect to the digital subscriber line and the analog subscriber line.

6. The analog/digital integrated subscriber circuit as claimed in claim 1, which further comprises:
   a hybrid circuit coupled to said signal processing part and the subscriber line,
   said hybrid circuit including a hybrid transformer, and means for switching a turn ratio of windings of the hybrid transformer with respect to the digital subscriber line and the analog subscriber line.

7. The analog/digital integrated subscriber circuit as claimed in claim. 1, wherein said signal processing part comprises:
   a pre-filter;
   a post-filter; and
   means for switching circuit constants of the pre-filter and the post-filter so as to switch cutoff frequencies of the pre-filter and the post-filter with respect to the digital subscriber line and the analog subscriber line.

8. The analog/digital integrated subscribe circuit as claimed in claim 1, wherein said signal processing part comprises:
   an analog-to-digital converter;
   a digital-to-analog converter; and
   means for switching sampling frequencies of the analog-to-digital converter and the digital-to-analog converter with respect to the digital subscriber line and the analog subscriber line.

9. The analog/digital integrated subscriber circuit as claimed in claim 1, which further comprises:
   a hybrid circuit coupled to said signal processing part and the subscriber line; and
   a network interface circuit coupled to said signal processing part,
   wherein said signal processing part comprises:
      a digital signal processor processing a signal input from the subscriber line and a signal input via said network interface circuit;
      a first transmitting part for a digital subscriber, including a driver, inputting one of a transmitting signal via said network interface circuit and a transmitting signal processed by the digital signal processor;
      a second transmitter for an analog subscriber, including a digital-to-analog converter inputting the transmitting signal processed by the digital signal processor and a post-filter;
      a switch switching the first transmitting part and the second transmitting part with respect to said hybrid circuit; and
      a receiving part, including a pre-filter and an analog-to-digital converter, inputting a received signal obtained via said hybrid circuit to the digital signal processor via the pre-filter and the analog-to-digital converter.

10. The analog/digital integrated subscriber circuit as claimed in claim 1, which further comprises:
    a hybrid circuit coupled to said signal processing part and the subscriber line,
    said signal processing part comprising:
       a digital signal processor processing a signal input from the subscriber line;
       a receiving part including a pre-filter and a $\Sigma/\Delta$ modulator and inputting a received signal obtained via said hybrid circuit to the digital signal processor via the pre-filter and the $\Sigma/\Delta$ modulator;
       a first transmitting part for an analog subscriber, including an interpolation filter, a $\Sigma/\Delta$ modulator, a post-filter and an analog subscriber driver, inputting a transmitting signal processed by the digital signal processor to said hybrid circuit via the interpolation filter, the $\Sigma/\Delta$ modulator, the post-filter and the analog subscriber driver; and
       a second transmitting part for a digital subscriber, including a digital subscriber driver, inputting a transmitting signal processed by the digital signal processor to said hybrid circuit via the digital subscriber driver,
    said digital signal processor including means for controlling the analog subscriber driver to an active state and the digital subscriber driver to a power down state when an analog subscriber line is connecter to said hybrid circuit, and for controlling the analog subscriber driver to a power down state and the digital subscriber driver to an active state when a digital subscriber line is connected to said hybrid circuit.

11. The analog/digital integrated subscriber circuit as claimed in claim 10, wherein said hybrid circuit comprises:
    a first winding coupled to the subscriber line;
    a second winding coupling the pre-filter and the analog subscriber driver; and
    a third winding coupled to the digital subscriber driver.

12. The analog/digital integrated subscriber circuit as claimed in claim 10, wherein said digital signal processor includes means for generating a signal having a waveform corresponding to a terminating impedance with respect to an analog subscriber line and adding this signal to the transmitting signal when the analog subscriber line is coupled to said hybrid circuit.

* * * * *